US012720017B2

(12) United States Patent
Anand

(10) Patent No.: US 12,720,017 B2
(45) Date of Patent: Aug. 25, 2026

(54) VEHICLE TRAFFIC MONITORING DEVICE SYSTEMS AND METHODS

(71) Applicant: Boost SubscriberCo L.L.C., Englewood, CO (US)

(72) Inventor: Sudir Anand, Cincinnati, OH (US)

(73) Assignee: Boost SubscriberCo L.L.C., Englewood, CO (US)

( * ) Notice: Subject to any disclaimer, the term of this patent is extended or adjusted under 35 U.S.C. 154(b) by 0 days.

(21) Appl. No.: 18/605,300

(22) Filed: Mar. 14, 2024

(65) Prior Publication Data

US 2024/0430387 A1 Dec. 26, 2024

Related U.S. Application Data

(60) Provisional application No. 63/522,646, filed on Jun. 22, 2023.

(51) Int. Cl.

| | |
|---|---|
| ***H04N 7/18*** | (2006.01) |
| ***G06V 20/54*** | (2022.01) |
| ***H04L 65/60*** | (2022.01) |
| ***H04N 23/61*** | (2023.01) |
| ***H04N 23/69*** | (2023.01) |

(52) U.S. Cl.

CPC ............. *H04N 7/183* (2013.01); *G06V 20/54* (2022.01); *H04L 65/60* (2013.01); *H04N 23/61* (2023.01); *H04N 23/69* (2023.01)

(58) Field of Classification Search

CPC ........ H04N 7/183; H04N 23/61; H04N 23/69; H04L 65/60; G06V 20/54

USPC .......................................................... 348/149

See application file for complete search history.

(56) References Cited

U.S. PATENT DOCUMENTS

| | | | |
|---|---|---|---|
| 10,573,183 B1 | 2/2020 | Li et al. | |
| 10,916,131 B1 * | 2/2021 | Schottland | G08G 1/0133 |
| 10,997,430 B1 | 5/2021 | Slavin | |
| 11,096,036 B2 | 8/2021 | Poornachandran et al. | |
| 2013/0044218 A1 | 2/2013 | Matsuda et al. | |
| 2015/0019266 A1 | 1/2015 | Stempora | |
| 2016/0241839 A1 * | 8/2016 | Crona | G08G 1/052 |
| 2017/0124788 A1 * | 5/2017 | Nishida | G07C 5/0866 |

(Continued)

FOREIGN PATENT DOCUMENTS

| | | |
|---|---|---|
| CN | 102859567 A | 1/2013 |
| CN | 109237376 A | 1/2019 |

(Continued)

*Primary Examiner* — Thai Q Tran
*Assistant Examiner* — Stephen R Smith
(74) *Attorney, Agent, or Firm* — Jeremiah J. Baunach; Frontier IP Law PLLC

(57) ABSTRACT

A connected streetlamp has live video feed zooming capabilities, Fifth Generation (5G) cellular wireless functionality, and traffic analytics capabilities using artificial intelligence (AI) and computer vision image recognition functionality built in to the monitoring device operably attached to or otherwise integrated with the streetlamp head. In other embodiments, the monitoring device may be located on or integrated with other parts of the streetlamp, or located on or integrated with a telephone poll, post, fence, building or other structure located alongside or near a street or road. A vehicle traffic monitoring system may include a plurality of multi-access edge computing (MEC) vehicle traffic monitoring devices each integrated in a respective connected streetlamp.

20 Claims, 20 Drawing Sheets

(56) References Cited

U.S. PATENT DOCUMENTS

2017/0264890 A1* 9/2017 Gorilovsky ............ G03B 37/04
2019/0205659 A1* 7/2019 Cuban .................... G06V 20/41
2020/0004984 A1* 1/2020 Lee ......................... G06F 12/14
2020/0107008 A1* 4/2020 Hur ...................... H04N 13/183
2020/0184221 A1* 6/2020 Alexander ............. G06V 20/13
2021/0019645 A1* 1/2021 Petrey, Jr. ............ G06N 3/0442
2021/0258515 A1* 8/2021 Rees ......................... G01J 5/02
2021/0400242 A1* 12/2021 Cui ........................ G06V 40/25
2022/0124287 A1* 4/2022 Preston ................. H04W 4/021
2022/0224918 A1* 7/2022 Maeda ................... H04N 19/70
2022/0332337 A1 10/2022 Ran et al.
2022/0368972 A1 11/2022 Cheraghi et al.
2023/0004666 A1* 1/2023 Beagle ................. G06V 20/625
2023/0061784 A1 3/2023 Agrawal et al.
2023/0140584 A1 5/2023 Stenneth et al.
2023/0148351 A1* 5/2023 Kadar .................. G08G 1/0116 348/149
2023/0237850 A1* 7/2023 Figueiredo ............. G06V 40/20 340/573.1
2023/0370328 A1* 11/2023 Kim ........................ G06F 9/453
2024/0098225 A1* 3/2024 Ophir ................... G05D 1/0038
2024/0098352 A1* 3/2024 Lee ........................ H04N 23/45
2024/0155571 A1* 5/2024 Atawia ............. H04W 72/0446
2024/0167840 A1 5/2024 Fei et al.
2024/0203052 A1* 6/2024 Foco ......................... G06T 7/33
2024/0333880 A1* 10/2024 Detmold .............. G08G 1/0116
2024/0404291 A1* 12/2024 Ward ...................... G01S 17/89
2025/0157223 A1* 5/2025 Tsubota ................. G06V 20/54

FOREIGN PATENT DOCUMENTS

CN 114084170 A 2/2022
CN 114023088 B 9/2022

* cited by examiner 110
104
114
106
108
112
102a

104
Streetlamp Head
116
Light
120
Monitoring Device
108
118b
118a
114
Street-
lamp
Arm
112
Streetlamp
Pole

VEHICLE TRAFFIC MONITORING DEVICE SYSTEMS AND METHODS

BRIEF SUMMARY

Vehicle drivers often experience traffic jams, potential traffic hazards, traffic issues or safety issues on the road. Quickly determining the root causes of such issues in real time may be beneficial to municipalities and drivers to mitigate such problems, thereby preventing additional issues going forward. For example, immediately alerting drivers to a traffic accident or dangerous situation on the road ahead and providing live video stream of the incident may enable the drivers to take evasive measures or take a detour to avoid the danger or delay. Providing such data to municipalities, news centers and first responders may also help the first responders plan and respond efficiently and effectively. Also, monitoring traffic patterns based on vehicle characteristics and time periods may help municipalities determine the root causes of the traffic issues or re-route traffic to help alleviate traffic jams.

In various example embodiments, a connected streetlamp has live video feed zooming capabilities, Fifth Generation (5G) cellular wireless functionality, and traffic analytics capabilities using artificial intelligence (AI) and computer vision image recognition functionality built in to the monitoring device operably attached to or otherwise integrated with the streetlamp head. In other embodiments, the monitoring device may be located on or integrated with other parts of the streetlamp, or located on or integrated with a telephone poll, post, fence, building or other structure located alongside or near a street or road. A vehicle traffic monitoring system may include a plurality of multi-access edge computing (MEC) vehicle traffic monitoring devices each integrated in a respective streetlamp as above. The system may also include a master vehicle traffic monitoring device to which each MEC vehicle traffic monitoring device of the plurality of MEC vehicle traffic monitoring devices is communicatively connected via a wireless cellular network. For example, the plurality of MEC vehicle traffic monitoring devices and the master vehicle traffic monitoring device may be present on a 5G wireless network. In an example embodiment, the master vehicle traffic monitoring device is communicatively connected to the 5G core network. Each respective MEC vehicle traffic monitoring device of the plurality of MEC vehicle traffic monitoring devices may view scenes outside the MEC vehicle traffic monitoring device and generate live video of the viewed scenes in at least a high-definition (HD) resolution; perform object recognition on frames of the live video in real time using computer vision techniques; make one or more determinations whether there exists a potential traffic hazard, traffic issue, safety issue or particular vehicle characteristic based on the object recognition; include in electronic reports data indicative of the one or more determinations whether there exists a potential traffic hazard, traffic issue, safety issue or particular vehicle characteristic based on the generated live video; and transmit the electronic reports to the master vehicle traffic monitoring device during an occurrence of the potential traffic hazard, traffic issue, safety issue or particular vehicle characteristic via a wireless cellular network connection module of the master vehicle traffic monitoring device.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figures 1A, 1B:
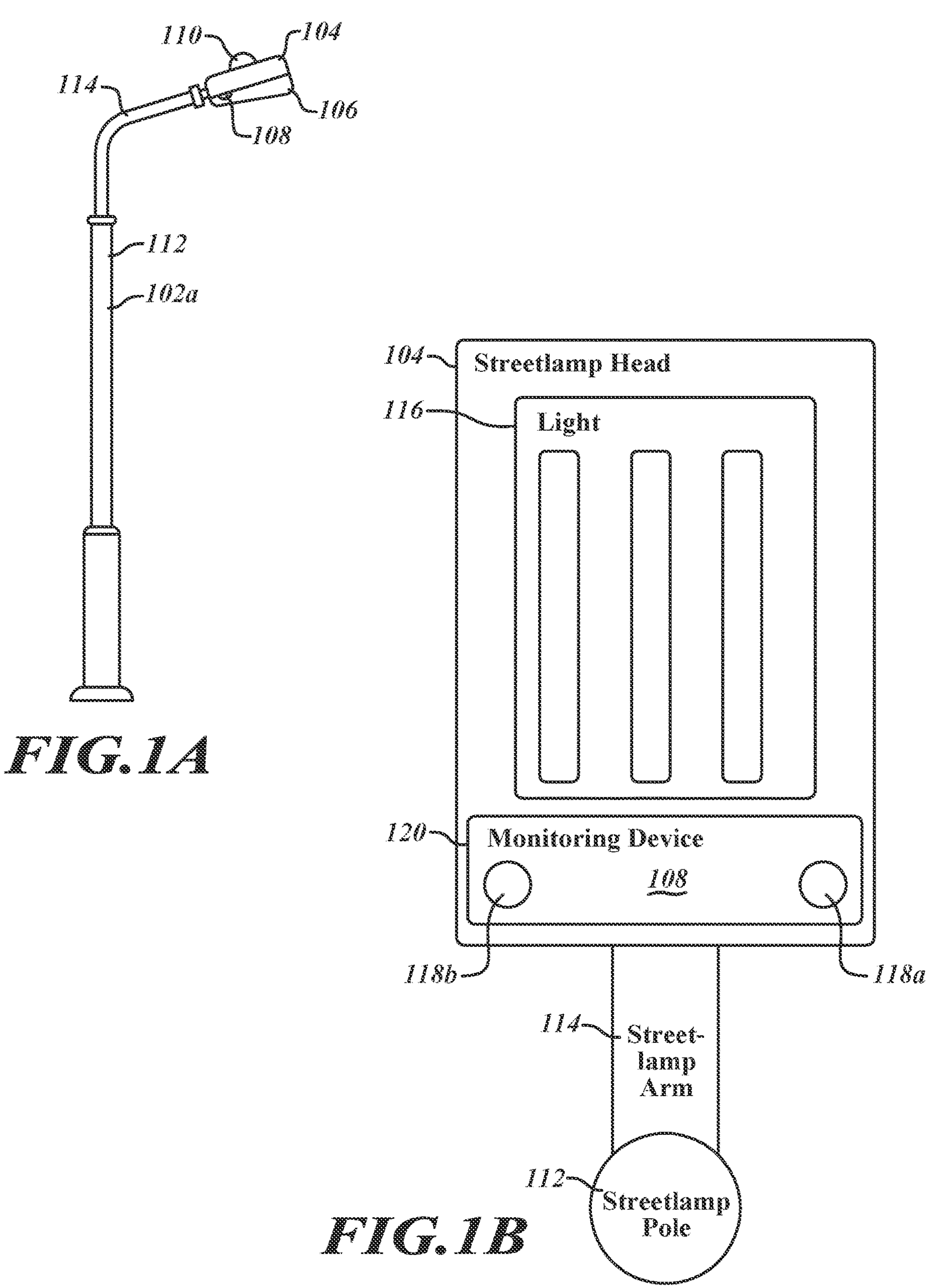
FIG. 1A is a side elevation view illustrating an example streetlamp that has a vehicle traffic monitoring device integrated into it according to one non-limiting embodiment.
FIG. 1B is a plan view of the underside of the streetlamp head of the streetlamp of FIG. 1A, according to one non-limiting embodiment.

FIG. 1A is a side elevation view illustrating an example streetlamp 102*a* that has a vehicle traffic monitoring device 108 integrated into it according to one non-limiting embodiment and FIG. 1B is a plan view of the underside of the streetlamp head 104 of the streetlamp 102*a* of FIG. 1A, according to one non-limiting embodiment.

In various example embodiments, the streetlamp 102*a* has live video feed zooming capabilities, 5G functionality, and traffic analytics capabilities using artificial intelligence (AI) and computer vision image recognition functionality built in to the vehicle traffic monitoring device 108 operably attached to or otherwise integrated with the streetlamp head 104. In other embodiments, the vehicle traffic monitoring device 108 may be located on or integrated with other parts of the streetlamp 102*a*, or located on or integrated with a telephone poll, post, fence, building or other structure located alongside or near a street or road.

5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible and virtualized RAN with interfaces creating additional data access points.

5G network functions may be completely software-based and designed as cloud-native, meaning that they're agnostic to the underlying cloud infrastructure, allowing higher deployment, agility and flexibility. With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in cloud computing that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power better enables the high volume of connected devices inherent to 5G deployment and the rise of IoT. In an example embodiment, the streetlamp 102*a* may be part of a network of such connected streetlamps each having MEC vehicle traffic monitoring devices integrated therein to perform local image processing and analytics.

In an example embodiment, streetlamp 102*a* may comprise a streetlamp pole 112, a curved streetlamp arm 114 extending from the top of the streetlamp pole 112 and a streetlamp head 104 attached to the end of the curved streetlamp arm 114. The streetlamp head 104 may include a light 116 and the vehicle traffic monitoring device 108. The vehicle traffic monitoring device 108 may have mounted within a device housing 120 two built-in sensors (e.g., video camera 118*a* and video camera 118*b*) to get a 360-degree view around the streetlamp 102*a* and/or generate stereoscopic still frames and/or or video thereby enabling generation of a three dimensional (3D) model of scenes around the streetlamp 102*a*. In some embodiments, the vehicle traffic monitoring device 108 may also include one or more infrared sensors (e.g., other sensors 212 shown in FIG. 2) to detect, capture, and/or analyze road and vehicle conditions in fog, heavy rain or darkness and transmit relevant data in real time (e.g., data regarding a potential traffic hazard, traffic issue or safety issue, including, but not limited to: current and/or historical vehicle traffic data, vehicle characteristics and identification data, objects, people and/or animals in or near the road, vehicle license plate information, data regarding existence and position of a vehicle, other vehicle information, and/or information regarding overheating of vehicle systems and roads). Such other sensors 212 may in some embodiments be located on top of the streetlamp head 104 protected by a clear or opaque protective cover 110, or on other areas of the streetlamp head 104 or streetlamp 102*a*, and operably connected to the vehicle traffic monitoring device 108 via a wired or wireless connection.

The vehicle traffic monitoring device 108 may receive power from the same source as that of the light 116 and/or from a separate source (e.g., a separate solar panel (not shown) mounted on the streetlamp head 104). The streetlamp head 104 may also have a glass, plastic or polymer clear lens 106 attached under the streetlamp head 104 covering and protecting the light and/or monitoring device.

Figure 2:
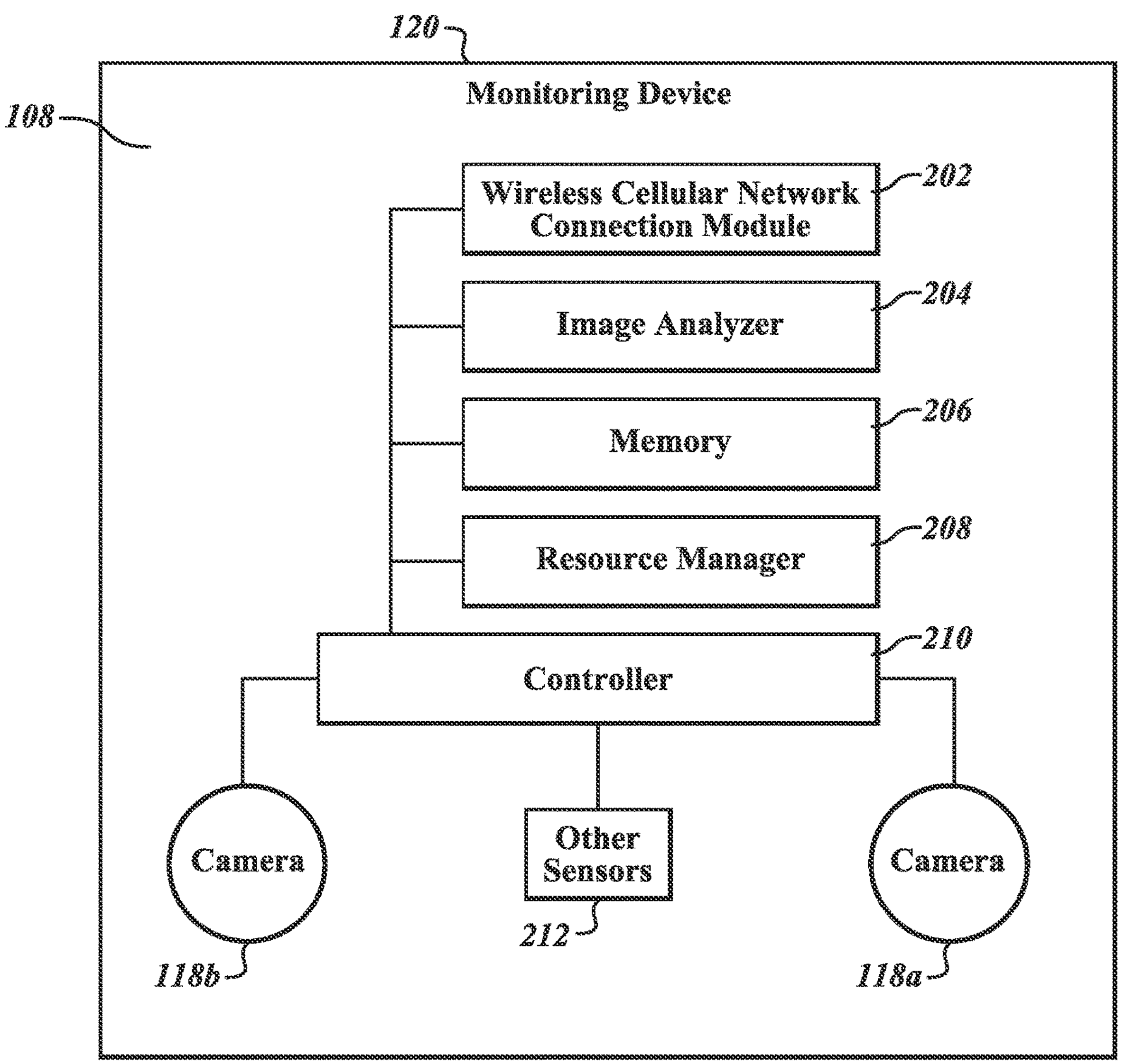
FIG. 2 is a block diagram illustrating elements of an example vehicle traffic monitoring device, according to one non-limiting embodiment.

FIG. 2 is a block diagram illustrating elements of an example vehicle traffic monitoring device 108, according to one non-limiting embodiment.

In an example embodiment, the vehicle traffic monitoring device 108 includes a device housing 120, at least one video camera (e.g., video camera 118*a* and video camera 118*b*) mounted or otherwise located in the device housing 120 that views scenes outside the device housing and generates live video of the viewed scenes in at least a high-definition (HD) resolution. The vehicle traffic monitoring device 108 may also include an image analyzer 204 mounted or otherwise located in the device housing 120. The image analyzer 204 may be configured to perform local analytics of video and images captured by video camera 118*a* and/or video camera 118*b* and generate electronic reports regarding frames of the video based on the local analytics performed by the image analyzer 204. For example, the image analyzer 204 may include in the electronic reports data indicative of the determination whether there exists a potential traffic hazard, traffic issue or safety issue.

A wireless cellular network connection module 202 may also be included in or connected to the vehicle traffic monitoring device 108 device housing 120. In an example embodiment, the wireless cellular network connection module 202 may include various equipment and interfaces, such as wireless transmitters, receivers and antenna (e.g., one or more fifth generation (5G) wireless transmitters, receivers and antenna), cellular telecommunication network equipment and interfaces (e.g., 5G wireless cellular telecommunication network equipment and interfaces), and/or other computer network equipment and interfaces to send and receive data as described herein, such as to send and receive instructions, commands and data to implement the processes described herein. For example, the wireless cellular network connection module 202 may be configured to stream the generated live video via the wireless cellular network connection module and transmit the electronic reports regarding the frames generated by the image analyzer 204.

In various example embodiments, the wireless cellular network connection module 202 is configured to stream the generated live video and/or other data via the wireless cellular network connection module 202 at one or more various rates of speed suitable for streaming live video and/or other data to other devices or servers (e.g., other streetlamps, cellular telephones, other mobile devices, hubs, a master vehicle traffic monitoring device, multi-access edge computing devices, content servers, media content servers, content servers of streaming media content provider platforms, receiving devices, televisions, set-top boxes, etc.) via a 5G wireless network. For example, in various embodiments, the wireless cellular network connection module 202 may be configured to stream the generated live video via the wireless cellular network connection module at a rate of at least about 15 Mbps, at least about 1 Gbps, or at least about 10 Gbps.

The vehicle traffic monitoring device 108 may also include a resource manager 208 mounted or otherwise located in the device housing 120. In an example embodiment, the resource manager 208 may determine whether there exist enough computing resources available in the vehicle traffic monitoring device 108 to perform the functions and operations of the vehicle traffic monitoring device 108 described herein and to offload performance of such functions and operations to one or more other traffic monitoring device wirelessly connected to vehicle traffic monitoring device 108 via the wireless cellular network connection module 202.

In an example embodiment, a controller 210 is also mounted or otherwise located in the device housing 120. The controller may include at least one processor (e.g., central processing unit (CPU) 2014 of FIG. 20) that is operably coupled to video camera 118*a* and video camera 118*b*, the image analyzer 204, the resource manager 208 and the wireless cellular network connection module 202 to partially or fully control operations of such components. At least one memory 206 may also be mounted or otherwise located in the device housing 120 and coupled to the processor of the controller 210. The memory 206 may have computer-executable instructions stored thereon that, when executed by the processor of the controller 210, cause the processor of the controller 210 to cause the vehicle traffic monitoring device 108 to perform the functions of the vehicle traffic monitoring device 108 described herein.

One or more other sensors 212 may be coupled to the controller 210 that provide data to the controller 210 and/or the image analyzer 204. In an example embodiment, the image analyzer 204 may use the data provided by the other sensors 212 in combination with the frames of the video captured by video camera 118*a* and/or video camera 118*b* to determine whether there exists a potential traffic hazard, traffic issue or safety issue on or near a road in proximity to the streetlamp 102*a* having the vehicle traffic monitoring device 108. For example, the other sensors 212 may include, but are not limited to, one or more of: a microphone; a thermometer; a rain sensor; a fog sensor; a barometer; a humidity sensor; a wind speed sensor; a heat signature sensor; an infrared sensor; a night vision sensor; a smoke detector; a fire detector; a proximity sensor; a light sensor; a pressure detector; a gas detector; a carbon dioxide sensor; an ultrasonic sensor; a color sensor; an accelerometer; a tilt sensor; a Light Detection and Ranging (LiDAR) device; a radar sensor; a speed detector for a sensed object; a position sensor; a global positioning system (GPS) device; and a photo optic sensor.

In various embodiments, various components of the vehicle traffic monitoring device 108, including the wireless cellular network connection module 202, the image analyzer 204, the memory 206, the resource manager 208, the controller 210, video camera 118*a*, video camera 118*b* and/or one or more other sensors 212, may be connected to the vehicle traffic monitoring device 108 via a wired or wireless connection, but physically located outside the vehicle traffic monitoring device 108 (e.g., on other areas of the streetlamp 102*a*).

Figure 3:
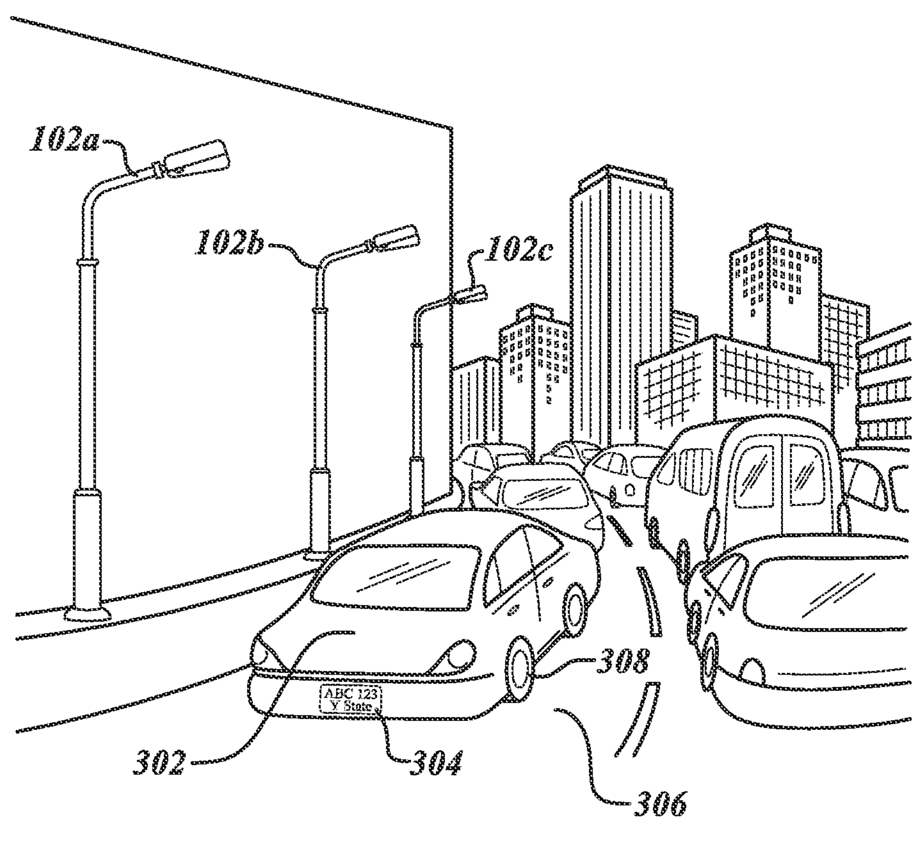
FIG. 3 is a perspective view of a plurality of streetlamps that each have a respective vehicle traffic monitoring device integrated therein and comprise a connected vehicle traffic monitoring system, according to one non-limiting embodiment.

FIG. 3 is a perspective view of a plurality of streetlamps (streetlamp 102*a*, streetlamp 102*b* and streetlamp 102*c*) that each have a respective vehicle traffic monitoring device integrated therein and comprise a connected vehicle traffic monitoring system, according to one non-limiting embodiment.

In an example embodiment, each respective vehicle traffic monitoring device integrated in streetlamp 102*a*, streetlamp 102*b* and streetlamp 102*c* detects in frames of the video one or more characteristics of one or more vehicles on a road 306 adjacent to the respective streetlamp. For example, the respective vehicle traffic monitoring device integrated in streetlamp 102*a* may capture in real time live video of vehicle 302 as it passes by streetlamp 102*a* on the road 306 and determine whether there exists a potential traffic hazard, traffic issue or safety issue related to vehicle 302 based on the one or more detected characteristics of vehicle 302. The respective vehicle traffic monitoring device integrated in streetlamp 102*a* may include in electronic reports data indicative of the determination whether there exists a potential traffic hazard, traffic issue or safety issue related to vehicle 302.

For example, the vehicle traffic monitoring device integrated in streetlamp 102*a* may perform image analysis including automated object recognition to recognize vehicles passing by streetlamp 102*a*, such as vehicle 302, to determine how many vehicles are passing by streetlamp 102*a* during any given time period, as well as how many vehicle having particular vehicle characteristics are passing by streetlamp 102*a* during any given time period (e.g., vehicles having particular make, model, color, year, particular license plate characteristics, expired tabs, state or jurisdiction issuing license plate, vehicle identification information, number of passengers, which lane the vehicle is in, speed of vehicle, noise level of vehicle, etc.). The streetlamp 102*a* may also use such data and/or include such data in reports in wired or wireless communications with other streetlamps which are collecting such data based on their individual locations along road 306 (e.g., streetlamp 102*b* and streetlamp 102*c*, etc.) and/or a master vehicle traffic monitoring device or server for the streetlamp 102*a* and/or other device to determine current and historical traffic patterns, traffic conditions, traffic backups, etc., on the road 306. Such data may then be communicated wirelessly to other devices such as commuters' cellular telephones, other mobile devices and/or other servers.

As another example, the vehicle traffic monitoring device integrated in streetlamp 102*a* may capture license plate characteristics 304 (e.g., license plate number, state issuing license plate, license plate tab expiration date, etc.) recognized in license plate imagery in video of vehicle 302 captured by the vehicle traffic monitoring device integrated in streetlamp 102*a*. The vehicle identification information (e.g., from capture license plate characteristics 304) may then be included in the electronic reports along with date and time of day data to provide data to determine statistics regarding the total number and rate of out of state vehicles traveling on the road 306 during a particular time period. Also, in some embodiments, the camera or other sensors of the vehicle traffic monitoring device integrated in streetlamp 102*a* may include an infrared video camera and the generated live video may include infrared video frames. The traffic monitoring device integrated in streetlamp 102*a* may then detect in frames of the video a heat signature of one or more characteristics of vehicle 302 (e.g., heat characteristic of tire 308) on the road 306.

In an example embodiment, the vehicle traffic monitoring device 108 integrated in streetlamp 102*a* (or a device connected to the vehicle traffic monitoring device 108) may perform traffic analysis on the road 306 depicted in the generated live video captured by a camera of the vehicle traffic monitoring device 108 based on object detection recognizing in the frames of the generated live video one or more characteristics of vehicles in traffic on the road. Such characteristics may include, but are not limited to: one or more license plate characteristics 304 of each vehicle; which states issued a license plate for each vehicle; whether a license plate is expired; type of each vehicle; make, model and year of each vehicle; how many passengers each vehicle is able to carry; how many passengers each vehicle is carrying; whether each vehicle is a taxi; whether each vehicle is a rideshare vehicle; estimated weight of each vehicle; number of times each vehicle has been detected on a particular stretch of road over a particular time period; a time of day each vehicle has been detected on a particular stretch of road; speed of traffic on a particular stretch of road captured by the vehicle traffic monitoring device; statistics regarding speed of traffic on a particular stretch of road captured by the vehicle traffic monitoring device over one or more particular selectable time periods; etc.

The vehicle traffic monitoring device 108 integrated in streetlamp 102*a* (or another device to which the detected characteristics of vehicle 302 are communicated) may determine whether there exists a potential traffic hazard, traffic issue or safety issue based on the detected heat signature (e.g., that tire 308 detected temperature has indicated recent extreme skidding on pavement of the road 306). The monitoring device integrated in streetlamp 102*a* may then include in the electronic reports (e.g., communicated to one or more other streetlamps, such as streetlamp 102*b* and streetlamp 102*c*, which may be or include a master vehicle traffic monitoring device) data indicative of the determination whether there exists a potential traffic hazard, traffic issue or safety issue. Data or alerts communicated to other devices, such as mobile devices of drivers detected to be in proximity to the potential traffic hazard, traffic issue or safety issue, electronic road signs detected to be in proximity to the potential traffic hazard, traffic issue or safety issue, and/or other information dissemination systems or servers may include information from or based on such reports.

Figure 4:
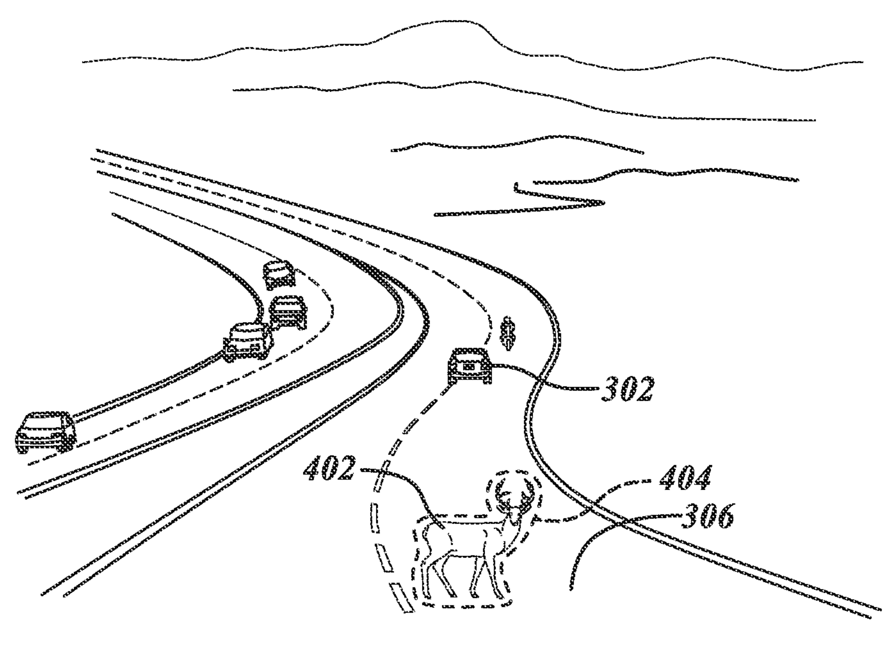
FIG. 4 is a perspective view of a road on which a vehicle traffic monitoring device has determined there exists a potential traffic hazard, traffic issue or safety issue based on object recognition, according to one non-limiting embodiment.

FIG. 4 is a perspective view of a road 306 on which a vehicle traffic monitoring device, such as the vehicle traffic monitoring device 108 integrated in streetlamp 102*a*, has determined there exists a potential traffic hazard, traffic issue or safety issue based on object recognition, according to one non-limiting embodiment.

In an example embodiment, the image analyzer 204 of the vehicle traffic monitoring device 108 (shown in FIG. 2) performs object recognition on the frames of the video using computer vision techniques to make one or more determinations whether there exists a potential traffic hazard, traffic issue or safety issue based on the video. In the present example shown in FIG. 4, the object recognition of the image analyzer 204 had recognized a deer 402 in the middle of the road 306. In an example embodiment, the image analyzer 204 determines there exists a potential traffic hazard, traffic issue or safety issue existing within a particular region of the frames of the video (e.g., the deer 402 in the road 306). In response to the determination made by the image analyzer 204, the image analyzer 204 may select the particular region of the frames of the video in which the potential traffic hazard, traffic issue or safety issue is determined to exist (e.g., the frames of the video in which the deer 402 is recognized) to transmit video of that region in real time via the wireless cellular network connection module 202. In particular, the image analyzer 204 may select the particular region of the frames of the video in which the potential traffic hazard, traffic issue or safety issue is determined to exist (e.g., the frames of the video in which the deer 402 is recognized) to have one or both of video camera 118*a* and video camera 118*b* zoom in on a scene identified by the particular region (e.g., zoom in on the detected deer 402).

Based on the determination made by the image analyzer 204, the controller 210 may cause one or both of video camera 118*a* and video camera 118*b* to zoom in on the scene identified by the particular region (e.g., to zoom in on the detected deer 402). The wireless cellular network connection module 204 may then stream live video generated by one or both of video camera 118*a* and video camera 118*b* zoomed in on the scene identified by the particular region.

The vehicle traffic monitoring device 108 may also perform image processing to provide a graphical outline 404 of the deer 402 or other highlighting of the deer 402 on live video of the deer 402 (or other detected object) being streamed in real time from the streetlamp 102*a* to vehicle 302, a mobile device of a driver associated with vehicle 302, one or more particular mobile devices detected to be traveling on the road 306 (e.g., in vehicles) in proximity to the deer 402 or to one or more other remote servers or warning systems. For example, the live video may be streamed to such devices or warning systems in response to vehicle 302 or the particular mobile device(s) being detected as being within a certain proximity threshold to the deer 402 (e.g., 50 feet, 100 feet, 200 feet, 300 feet, 400 feet or 500 feet, etc.) by the streetlamp 102*a*, Global Positioning System (GPS) or other location detection system wirelessly connected to the streetlamp 102*a*, vehicle 302 and/or the particular mobile device(s). In some embodiments, the proximity threshold may also be in relationship with or otherwise based on a detected current speed of the vehicle 302 and/or detected mobile device (e.g., the higher the detected current speed of the vehicle 302 or particular mobile device approaching the deer 402 is, the larger the distance from the vehicle 302 or particular mobile device to the deer 402 is when a warning and/or live video feed is initiated for the vehicle 302 and/or the particular mobile device).

The image analyzer 204 may include in electronic reports the data indicative of the determinations whether there exists a potential traffic hazard, traffic issue or safety issue (e.g., the deer 402 in the road 306) based on the video. The wireless cellular network connection module 202 of the vehicle traffic monitoring device 108 may then transmit the electronic reports during an occurrence of the potential traffic hazard, traffic issue or safety issue wirelessly to other devices, for example, to warn or alert a driver of vehicle 302. In an example embodiment, the wireless cellular network connection module 202 of the vehicle traffic monitoring device 108 may transmit the electronic reports to vehicle 302, a mobile device of a driver associated with vehicle 302, one or more particular mobile devices detected to be traveling on the road 306 in proximity to the deer 402 or to one or more other servers or warning systems. For example, the reports may be transmitted to such devices or warning systems in response to vehicle 302 or the particular mobile device(s) being detected as being in proximity to the deer 402 by the streetlamp 102*a*, Global Positioning System (GPS) or other location detection system wirelessly connected to the streetlamp 102*a*, vehicle 302 and/or the particular mobile device(s). In some embodiments, such a warning system may include one or more signs along road 306 (not shown) that may use such received reports to flash a warning light, light up or otherwise electronically display a warning (e.g., for vehicle 302) regarding the potential traffic hazard, traffic issue or safety issue (e.g., the deer 402 in the road 306).

Figure 5:
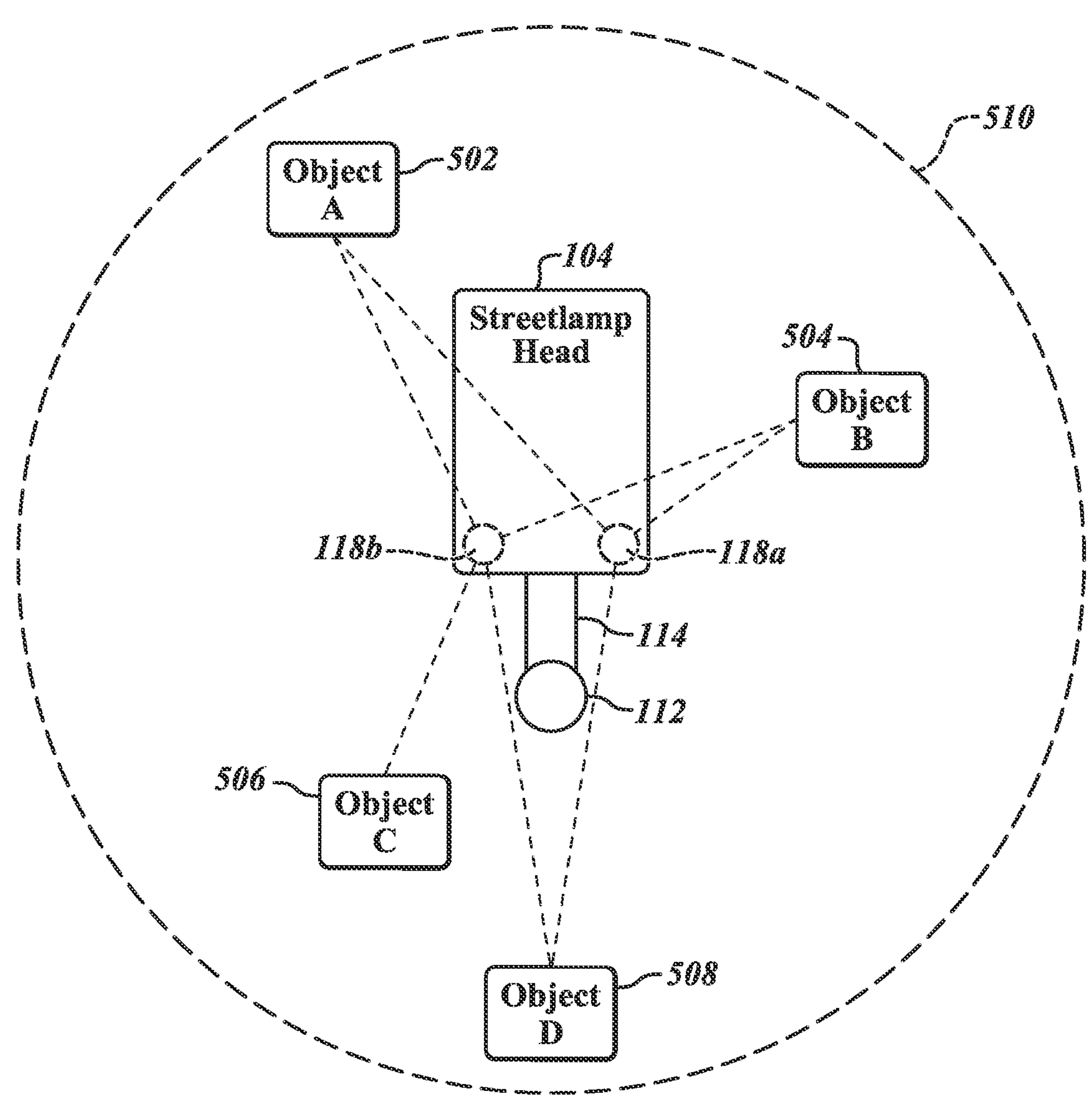
FIG. 5 is a top plan view of an example streetlamp that has a vehicle traffic monitoring device integrated illustrating various objects around the streetlamp that are recognized by the vehicle traffic monitoring device, according to one non-limiting embodiment.

FIG. 5 is a top plan view of an example streetlamp, such as streetlamp 102*a* of FIG. 1A, that has a vehicle traffic monitoring device 108 (Shown in FIG. 1B) integrated illustrating various example objects (object A 502, object B 504, object C 506 and object D 508) in an area 510 around the streetlamp and that are recognized by the vehicle traffic monitoring device 108, according to one non-limiting embodiment.

In various embodiments, object A 502, object B 504, object C 506 and object D 508 may include, but are not limited to, one or more of: a traffic accident; a traffic collision; a road hazard; and debris in the road; a hole in the road; a large crack, bump or missing pavement in the road; pooling water in the road; pieces of tire in the road; an oversized vehicle on the road; fog; rain; snow, sleet; hail; precipitation; inclement weather; a flood; high winds; a tornado; a storm; lightening; thunder; ice; reckless driving; speeding; a stalled vehicle; a roadblock; construction; one or mor people approaching the road; one or more people in, on or near the road; an active shooter; one or more animals approaching the road; one or more animals in, on or near the road; a fire; one or more emergency vehicles; a vehicle pile-up; emergency vehicle lights flashing, a barricade; a traffic stop; a sign indicating a traffic issue or road condition; a speed trap; a police vehicle; and an incident on a side of the road, etc.

Video camera 118*a* is positioned under streetlamp head 104 with a field of vision around the streetlamp on one side of the streetlamp pole 112 and video camera 118*b* is positioned under streetlamp head 104 with a field of vision around the streetlamp on the other side of the streetlamp pole 112 such that the generated live video form such cameras includes video of scenes behind the streetlamp pole 112 (e.g., video including detected object D 508). In an example embodiment, a video processor may be coupled to video camera 118*a* and/or video camera 118*b* (e.g., which may be included as part or separate from the image analyzer 204 or controller 210 of FIG. 2). The video processor may combine video generated from the video camera 118*a* and video generated from video camera 118*b* to generate live video that includes video of scenes behind the streetlamp pole 112 (e.g., which include object D). The image analyzer 204 may determine (e.g., using artificial intelligence (AI) and/or machine learning (ML) techniques) whether there exists a potential traffic hazard, traffic issue or safety issue based on the generated live video that includes video of scenes behind the streetlamp pole 112 of the streetlamp 102*a*.

In an example embodiment, the video processor combines stereoscopic frames from video generated from the video camera 118*a* and from video generated from video camera 118*b* to generate a three-dimensional (3D) model of scenes around the pole of the streetlamp. For example, these scenes may include object A 502, object B 504, object C 506 and/or object D 508. The image analyzer 204 then determines whether there exists a potential traffic hazard, traffic issue or safety issue based on the 3D model of scenes around the streetlamp pole 112 of the streetlamp 102*a*. In various embodiments, additional or fewer objects may be detected and analyzed by the vehicle traffic monitoring device 108 as described herein.

Figure 6:
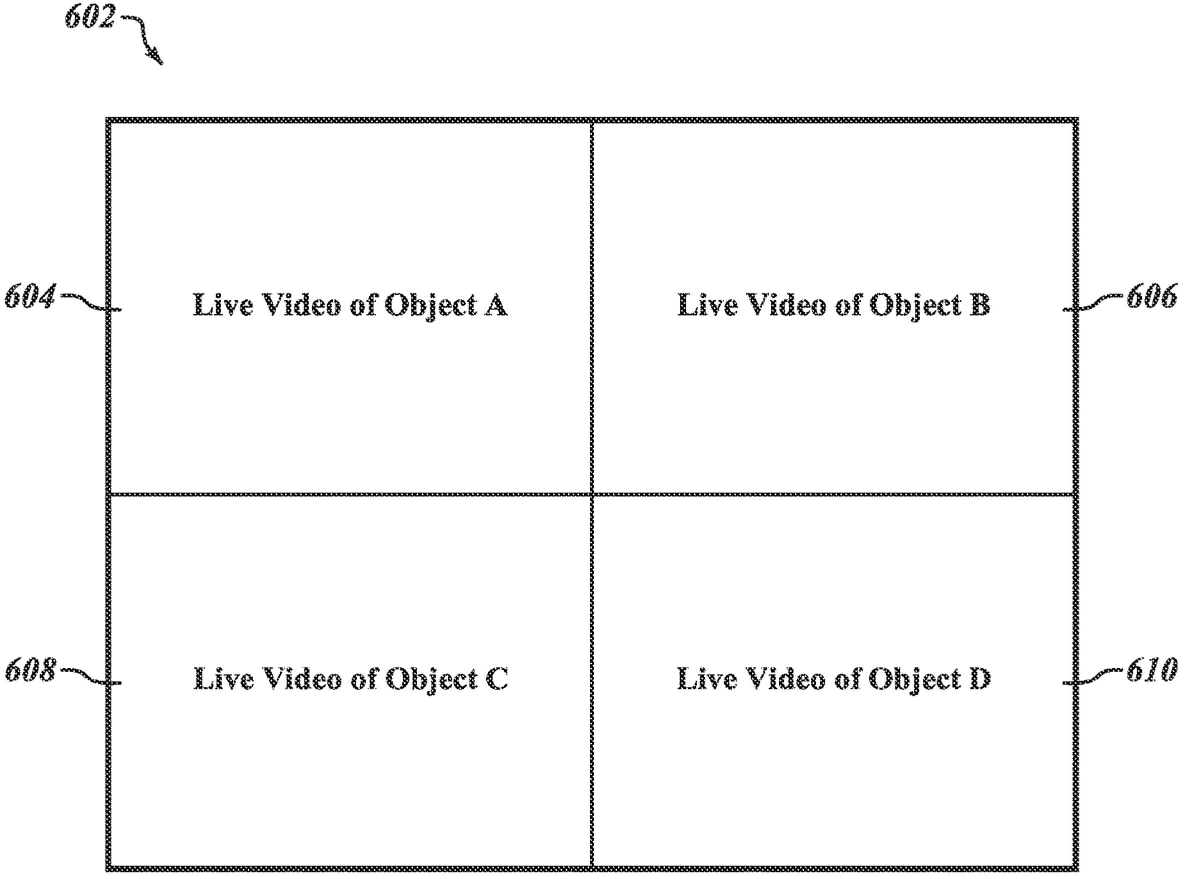
FIG. 6 is an illustration of a display of live video being generated by the vehicle traffic monitoring device of FIG. 5 with a separate live video stream being generated for each object recognized as shown in FIG. 5, according to one non-limiting embodiment.

FIG. 6 is an illustration of a display 602 of live video being generated by the vehicle traffic monitoring device 108 of FIG. 5 with a separate live video stream being generated for each object recognized as shown in FIG. 5, according to one non-limiting embodiment.

In the present example, live video of object A is being captured by video camera 118*a* and/or video camera 118*b* of FIG. 5, being streamed by vehicle traffic monitoring device 108 and presented in section 604 of a video frame or display 602. Concurrently, live video of object B is being captured by video camera 118*a* and/or video camera 118*b*, being streamed by vehicle traffic monitoring device 108 and presented in section 606 of a video frame or display 602. Concurrently, live video of object C is being captured by video camera 118*a* and/or video camera 118*b*, being streamed by vehicle traffic monitoring device 108 and presented in section 608 of a video frame or display 602. Concurrently, live video of object D is being captured by video camera 118*a* and/or video camera 118*b*, being streamed by vehicle traffic monitoring device 108 and presented in section 610 of a video frame or display 602.

In some embodiments, a video processor, which may be included as part of or separate from the image analyzer 204 or controller 210 of FIG. 2, may combine the live video stream of object A, the live video stream of object B, the live video stream of object C and/or the live video stream of object D into one composite video stream or signal. In various embodiments, the display 602 may be a display of a mobile device, vehicle navigation or infotainment system, remote device, computer, tablet, notebook computer, television, other streetlamp, cellular telephone, other mobile device, a master vehicle traffic monitoring device, multi-access edge computing device, content server, media content server, content server of a streaming media content provider platform, receiving device, television, or set-top box, etc.

Figure 7:
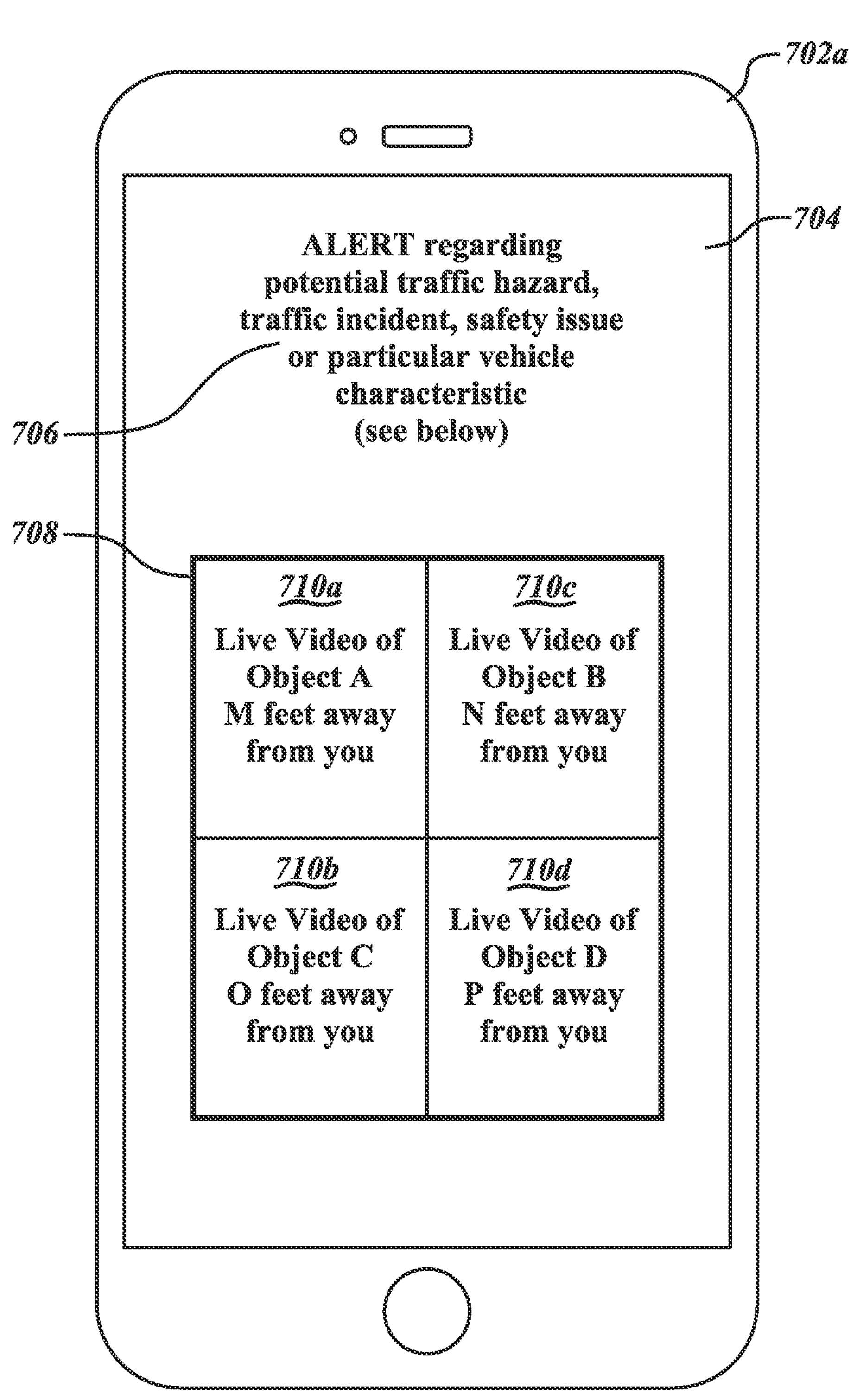
FIG. 7 is an illustration of a display of an alert that was caused to be generated by the vehicle traffic monitoring device of FIG. 5 regarding one or more of the objects recognized as shown in FIG. 5, according to one non-limiting embodiment.

FIG. 7 is an illustration of a display of an alert 706 that was caused to be generated by the vehicle traffic monitoring device 108 in the streetlamp head 104 of FIG. 5 regarding one or more of object A, object B, object C and/or object D recognized as shown in FIG. 5, according to one non-limiting embodiment.

In an example embodiment, in response to determining there exists a potential traffic hazard, traffic issue, safety issue or particular vehicle characteristic, the vehicle traffic monitoring device 108 may cause an alert 706 to be generated for one or more drivers of one or more vehicles determined to be potentially affected by the potential traffic hazard, traffic issue, safety issue or particular vehicle characteristic. In the present example, the alert 706 is caused by the vehicle traffic monitoring device 108 to be displayed on a display 704 of a user's mobile device 702*a*. For example, the vehicle traffic monitoring device 108 may cause a determination to be made that the mobile device 702*a* is within a certain threshold proximity to the determined potential traffic hazard, traffic issue, safety issue or particular vehicle characteristic. In response to that determination, the alert 706 may be sent to the mobile device 702*a* via a cellular wireless network (e.g., as a push notification or via an application running on the mobile device 702*a* subscribed to receive such notification). The determination that the mobile device 702*a* is within a certain threshold proximity to the determined potential traffic hazard, traffic issue, safety issue or particular vehicle characteristic (or that another condition for sending the alert is satisfied) may be made by the vehicle traffic monitoring device 108 or another remote device or warning system to which the vehicle traffic monitoring device 108 is connected and send reports regarding the detected objects or conditions (e.g., via a cellular 5G wireless connection).

In the example embodiment, in addition to textual warning information regarding the potential traffic hazard, traffic issue, safety issue or particular vehicle characteristic, the alert 706 includes live video 708 of the particular object or objects that is the subject of the potential traffic hazard, traffic issue, safety issue or particular vehicle characteristic (e.g., live video of a vehicle accident; object or hazard in the road; active shooter; overheating car engine, brakes, tires or road; first responder vehicles; inclement weather; traffic jam; etc.). For example, live video frame 710*a* shows live video of object A and text indicating the distance (e.g., how many feet) object A is currently away from mobile device 702*a* (e.g., based on GPS or other location services or systems connected to the vehicle traffic monitoring device 108, mobile device 702*a*, cellular base stations, and/or other connected traffic monitoring devices or systems). Similarly, live video frame 710*b* shows live video of object C and text indicating how many feet object C is currently away from mobile device 702*a*, live video frame 710*c* shows live video of object B and text indicating how many feet object B is currently away from mobile device 702*a* and live video frame 710*d* shows live video of object D and text indicating how many feet object D is currently away from mobile device 702*a*.

In addition to or instead of the alert 706, the vehicle traffic monitoring device 108 may cause a light, message or other visual indication to be activated on a pole on which the vehicle traffic monitoring device 108 is mounted to alert drivers on the road of the potential traffic hazard, traffic issue, safety issue or particular vehicle characteristic. In one example, this may include causing a light, message or other visual indication to be activated on a pole or sign alongside the road located some distance before a potential traffic hazard, traffic issue or safety issue determined by the vehicle traffic monitoring device 108 to be a root cause of traffic congestion on the road to alert drivers on the road approaching the determined root cause of traffic congestion.

The vehicle traffic monitoring device 108 or other connected device determining a location of the potential traffic hazard, traffic issue, safety issue or particular vehicle characteristic may be based on a location of the vehicle traffic monitoring device 108 that made the determination whether there exists the potential traffic hazard, traffic issue, safety issue or particular vehicle characteristic based on the generated live video.

In an example embodiment, the vehicle traffic monitoring device 108 or other device connected to the vehicle traffic monitoring device 108 may receive location information for a plurality of drivers based on or including, but not limited to, one or more of: GPS data associated with respective vehicles or mobile devices of the plurality of drivers; Gateway Mobile Location Centre (GMLC) data associated with respective vehicles or mobile devices of the plurality of drivers; location-based service (LBS) data associated with respective vehicles or mobile devices of the plurality of drivers; vehicle identification information recognized in license plate imagery in video of vehicles captured by the vehicle traffic monitoring device 108, the vehicle identification information associated with respective mobile devices of the one or more of the plurality of drivers; vehicle identification information recognized in license plate imagery in video of vehicles captured by other vehicle traffic monitoring devices within a selectable distance from the determined location of the potential traffic hazard, traffic issue, safety issue or particular vehicle characteristic, the vehicle identification information associated with respective mobile devices of the one or more of the plurality of drivers; a pairing of respective mobile devices of the plurality of drivers to respective vehicles identified by license plate imagery in video of vehicles captured by the vehicle traffic monitoring device 108 or one or more other vehicle traffic monitoring devices within a selectable distance from the determined location of the potential traffic hazard, traffic issue, safety issue or particular vehicle characteristic; and vehicle identification information from wireless identification devices in vehicles received by the vehicle traffic monitoring device 108 or one or more other vehicle traffic monitoring devices within a selectable distance from the determined location of the potential traffic hazard, traffic issue, safety issue or particular vehicle characteristic.

The vehicle traffic monitoring device 108 or other device connected to the vehicle traffic monitoring device 108 may then determine, based on the received location information, one or more drivers of one or more vehicles are potentially affected by the potential traffic hazard, traffic issue, safety issue or particular vehicle characteristic based on a proximity of each of the drivers to a location of the potential traffic hazard, traffic issue, safety issue or particular vehicle characteristic.

The vehicle traffic monitoring device 108 or other device connected to the vehicle traffic monitoring device 108 may then cause an alert 706 regarding the potential traffic hazard, traffic issue, safety issue or particular vehicle characteristic to be transmitted, via wireless cellular network connection module of the vehicle traffic monitoring device 108 or one or more other vehicle traffic monitoring devices within a selectable distance from the determined location of the potential traffic hazard, traffic issue, safety issue or particular vehicle characteristic, to the respective drivers of vehicles determined to be potentially affected by the potential traffic hazard, traffic issue, safety issue or particular vehicle characteristic.

Figure 8:
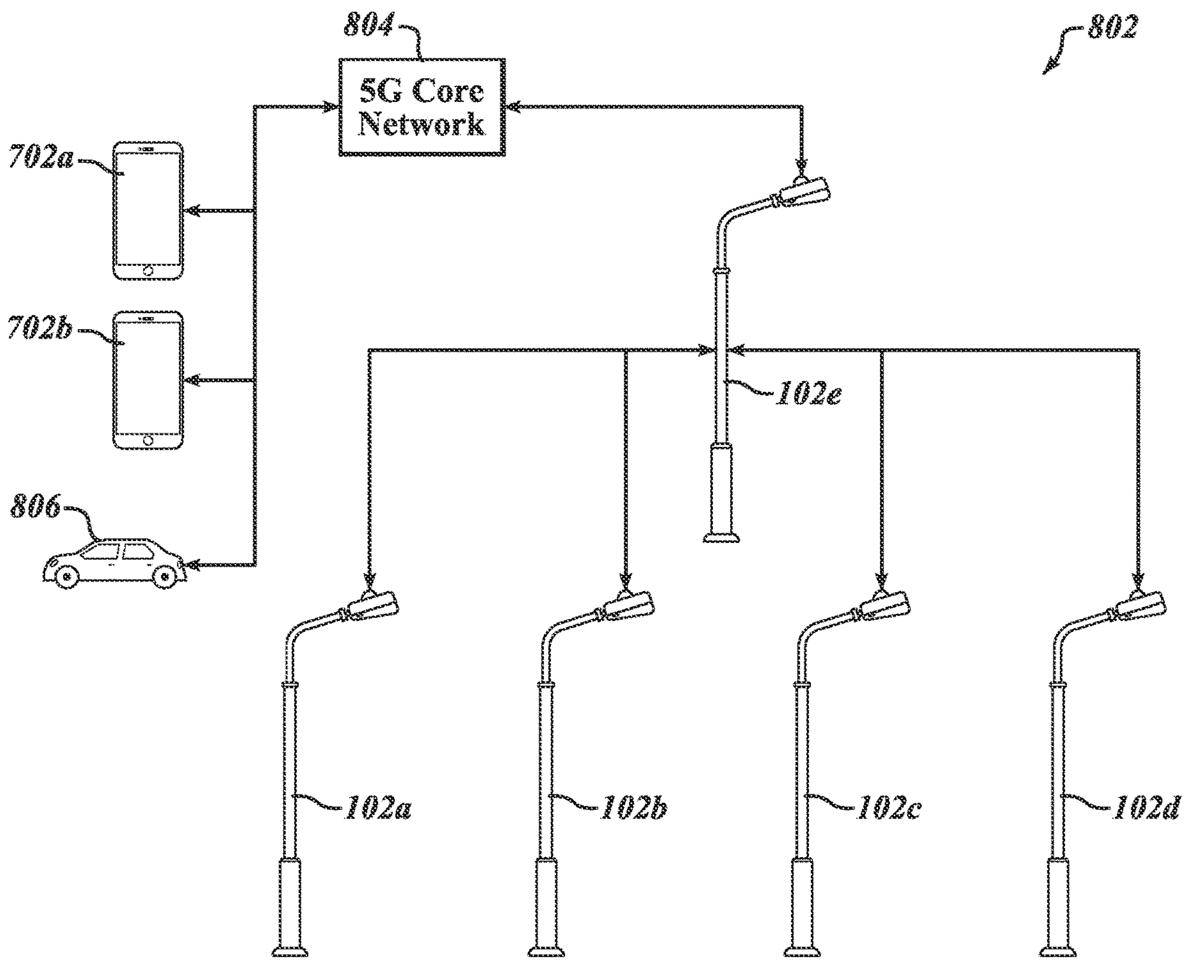
FIG. 8 is a block diagram of a vehicle traffic monitoring system comprising a plurality of vehicle traffic monitoring devices, according to one non-limiting embodiment.

FIG. 8 is a block diagram of a vehicle traffic monitoring system 802 comprising a plurality of vehicle traffic monitoring devices, according to one non-limiting embodiment.

Shown in FIG. 8 are a plurality of streetlamps that each include a respective multi-access edge computing (MEC) vehicle traffic monitoring device of a plurality of MEC vehicle traffic monitoring devices. In the present example, shown are streetlamp 102*a*, streetlamp 102*b*, streetlamp 102*c*, streetlamp 102*d*, each communicatively connected wirelessly to a master vehicle traffic monitoring device in streetlamp 102*e* (e.g., via a 5G wireless cellular network on which the plurality of MEC vehicle traffic monitoring devices and the master vehicle traffic monitoring device are present). In the present example, each MEC vehicle traffic monitoring device of the plurality of MEC vehicle traffic monitoring devices is communicatively connected via a wireless cellular network and the master vehicle traffic monitoring device in streetlamp 102*e* is communicatively connected to a core network of the wireless cellular network. In an example embodiment, each respective MEC vehicle traffic monitoring device in streetlamp 102*a*, streetlamp 102*b*, streetlamp 102*c* and streetlamp 102*d* views scenes outside the respective device and generates live video of the viewed scenes in at least a high-definition (HD) resolution; performs object recognition on frames of the live video in real time using computer vision techniques; makes one or more determinations whether there exists a potential traffic hazard, traffic issue, safety issue or particular vehicle characteristic based on the object recognition; includes in electronic reports data indicative of the one or more determinations whether there exists a potential traffic hazard, traffic issue, safety issue or particular vehicle characteristic based on the generated live video; and transmits the electronic reports to the master vehicle traffic monitoring device during an occurrence of the potential traffic hazard, traffic issue, safety issue or particular vehicle characteristic via a wireless cellular network connection module of the vehicle traffic monitoring device.

One or more devices (e.g., mobile device 702*a*, mobile device 702*b* vehicle 806 and roadside sign (not shown)) connected to a wireless network via the 5G Core network 804 may receive alerts regarding an occurrence of the potential traffic hazard, traffic issue, safety issue or particular vehicle characteristic as described herein based on the electronic reports transmitted from one or more of the respective MEC vehicle traffic monitoring devices in streetlamp 102*a*, streetlamp 102*b*, streetlamp 102*c*, streetlamp 102*d* and streetlamp 102*e*.

In an example embodiment, each respective MEC vehicle traffic monitoring device of the plurality of MEC vehicle traffic monitoring devices, based on a determination whether to stream the generated live video to the master vehicle traffic monitoring device, streams the generated live video to the master vehicle traffic monitoring device in streetlamp 102*e* via the wireless cellular network connection module of the respective MEC vehicle traffic monitoring device in real-time at no less than 24 frames per second, with at least about a 15 Mbps data rate and with a latency rate no greater than about than 50 milliseconds. The number of streetlamps, respective MEC vehicle traffic monitoring devices, data rates, and latency and other connection characteristics may vary in different embodiments.

In an example embodiment, the determination of whether to stream the generated live video to the master vehicle traffic monitoring device in streetlamp 102*e* is made by the master vehicle traffic monitoring device based on the electronic reports. In other embodiments, the determination of whether to stream the generated live video to the master vehicle traffic monitoring device is made by the respective MEC vehicle traffic monitoring device in in streetlamp 102*a*, streetlamp 102*b*, streetlamp 102*c* or streetlamp 102*d*.

The master vehicle traffic monitoring device in streetlamp 102*e*, based on the electronic reports, may cause an alert regarding the potential traffic hazard, traffic issue, safety issue or particular vehicle characteristic to be transmitted via the 5G core network 804 to one or more drivers of one or more vehicles (e.g., vehicle 806) determined (e.g., by the master vehicle traffic monitoring device in streetlamp 102*e* or by the by the respective MEC vehicle traffic monitoring device in streetlamp 102*a*, streetlamp 102*b*, streetlamp 102*c* or streetlamp 102*d*) to be potentially affected by the potential traffic hazard, traffic issue, safety issue or particular vehicle characteristic. The alert may include a live video stream, such as that shown in FIG. 7, of the generated live video of the potential traffic hazard, traffic issue, safety issue or particular vehicle characteristic originating from the respective MEC vehicle traffic monitoring device.

In an example embodiment, the master vehicle traffic monitoring device in streetlamp 102*e* may receive a command from one or more drivers of the one or more vehicles (e.g., vehicle 806) determined to be potentially affected by the potential traffic hazard, traffic issue, safety issue or particular vehicle characteristic to zoom in on a particular region of the live video stream. The master vehicle traffic monitoring device may send the command to zoom in on a particular region of the live video stream to the respective MEC vehicle traffic monitoring device in streetlamp 102*a*, streetlamp 102*b*, streetlamp 102*c* or streetlamp 102*d* from which the generated live video of the potential traffic hazard, traffic issue, safety issue or particular vehicle characteristic originated. The master vehicle traffic monitoring device in streetlamp 102*e* then receives, in response to the sent command, generated live video of the particular region from the respective MEC vehicle traffic monitoring device and sends a live video stream of the received generated live video of the particular region via the 5G core network 804 of the wireless cellular network to the one or more drivers from which the command was received. For example, this live video stream may be transmitted to mobile device 702*a* associated with the driver and/or with the received command.

In an example embodiment, each respective MEC vehicle traffic monitoring device of the plurality of MEC vehicle traffic monitoring devices in streetlamp 102*a*, streetlamp 102*b*, streetlamp 102*c* and streetlamp 102*d* includes a resource manager such as the resource manager 208 of FIG. 2. The resource manager 208 may determine whether there exists enough computing resources available in the vehicle traffic monitoring device to perform additional object recognition on frames of additional live video in real time using computer vision techniques and making one or more additional determinations whether there exists a potential traffic hazard, traffic issue, safety issue or particular vehicle characteristic based on the additional object recognition.

In response to a determination there does not exist enough computing resources available in the MEC vehicle traffic monitoring device to perform the additional object recognition and the making one or more additional determinations, the resource manager 208 causes the additional live video to be transmitted to one or more other respective MEC vehicle traffic monitoring devices of the plurality of MEC vehicle traffic monitoring devices to perform the additional object recognition and the making one or more additional determinations. For example, if the MEC vehicle traffic monitoring device of streetlamp 102*a* does not have enough computing resources available in the MEC vehicle traffic monitoring device of streetlamp 102*a* to perform the additional object recognition and making one or more additional determinations, then this work may be offloaded by the resource manager 208 of MEC vehicle traffic monitoring device of streetlamp 102*a* to one or more of the respective MEC vehicle traffic monitoring devices of streetlamp 102*b*, streetlamp 102*c* and streetlamp 102*d*. The resource manager 208 included in a respective MEC vehicle traffic monitoring device may receive, from the one or more other respective MEC vehicle traffic monitoring devices of the plurality of MEC vehicle traffic monitoring devices, data, included in additional electronic reports, indicative of the one or more additional determinations whether there exists a potential traffic hazard, traffic issue, safety issue or particular vehicle characteristic based on the additional live video.

In an example embodiment, the master vehicle traffic monitoring device in streetlamp 102*e* may receive, from the one or more other respective MEC vehicle traffic monitoring devices of the plurality of MEC vehicle traffic monitoring devices, data, included in additional electronic reports, indicative of the one or more additional determinations whether there exists a potential traffic hazard, traffic issue, safety issue or particular vehicle characteristic based on the additional live video. Based on the additional electronic reports, the master vehicle traffic monitoring device in streetlamp 102*e* may cause an additional alert regarding the potential traffic hazard, traffic issue, safety issue or particular vehicle characteristic to be transmitted via the 5G core network 804 of the wireless cellular network to one or more drivers of one or more vehicles (e.g., vehicle 806) determined to be potentially affected by the potential traffic hazard, traffic issue, safety issue or particular vehicle characteristic.

The resource manager 208 included in the respective MEC vehicle traffic monitoring device (e.g., in streetlamp 102*a*) may cause the additional live video to be transmitted to one or more other respective MEC vehicle traffic monitoring devices of the plurality of MEC vehicle traffic monitoring devices (e.g., streetlamp 102*b*, streetlamp 102*c* and streetlamp 102*d*), by transmitting the additional live video to the master vehicle traffic monitoring device in streetlamp 102*e* for the master vehicle traffic monitoring device to transmit to the one or more other respective MEC vehicle traffic monitoring devices.

In an example embodiment, a respective MEC vehicle traffic monitoring device in streetlamp 102*a*, streetlamp 102*b*, streetlamp 102*c* or streetlamp 102*d* determines there concurrently exists a potential traffic hazard, traffic issue, safety issue or particular vehicle characteristic in multiple different scenes around the respective MEC vehicle traffic monitoring device and as a result then generates a separate live video stream for each potential traffic hazard, traffic issue, safety issue or particular vehicle characteristic concurrently existing in the multiple different scenes around the respective MEC vehicle traffic monitoring device. Each generated separate live video stream focuses on a different respective potential traffic hazard, traffic issue, safety issue or particular vehicle characteristic, wherein the additional live video includes each generated separate live video stream. The resource manager 208 of the respective MEC vehicle traffic monitoring device may then determine there does not exist enough computing resources available in the respective MEC vehicle traffic monitoring device to continue to perform the additional object recognition and to continue the making one or more additional determinations due to the additional live video including each generated separate live video stream.

Figure 9:
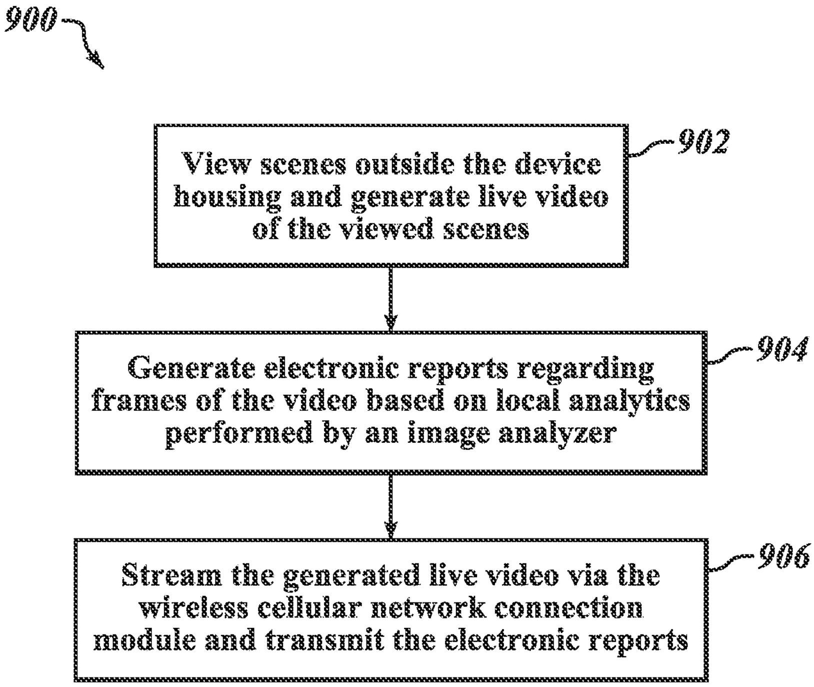
FIG. 9 is a flow diagram of an example method in a vehicle traffic monitoring device system, according to one non-limiting embodiment.

FIG. 9 is a flow diagram of an example method 900 in a vehicle traffic monitoring device system, according to one non-limiting embodiment.

At 902, at least one video camera in a vehicle traffic monitoring device views scenes outside the device housing and generates live video of the viewed scenes in at least a high-definition (HD) resolution. In an example embodiment, the at least one video camera includes a 360° video camera and the vehicle traffic monitoring device is integrated into a streetlamp that is on a substantially vertical pole. In an example embodiment, the at least one video camera includes an infrared video camera and the generated live video comprises infrared video frames.

At 904, an image analyzer in the vehicle traffic monitoring device generates electronic reports regarding frames of the video based on local analytics performed by the image analyzer. In an example embodiment, the image analyzer detects in frames of the video a heat signature of one or more characteristics of one or more vehicles on a road adjacent to the streetlamp; determines whether there exists a potential traffic hazard, traffic issue or safety issue based on the detected heat signature of the one or more characteristics of the one or more vehicles; and includes in the electronic reports data indicative of the determination whether there exists a potential traffic hazard, traffic issue or safety issue.

At 906, a wireless cellular network connection module in the vehicle traffic monitoring device streams the generated live video and transmits the electronic reports generated by the image analyzer. A controller comprising at least one processor may be coupled to the at least one video camera, the image analyzer and the wireless cellular network connection module. Also, one or more sensors may be coupled to the controller that provide data to the image analyzer. The image analyzer may use the data provided by the one or more sensors in combination with the frames of the video to determine whether there exists a potential traffic hazard, traffic issue or safety issue on or near a road in proximity to the vehicle traffic monitoring device.

In an example embodiment, the at least one video camera includes a first camera positioned under the streetlamp with a field of vision around the streetlamp on one side of the pole and a second camera positioned under the streetlamp with a field of vision around the streetlamp on the other side of the pole such that the generated live video includes video of scenes behind the pole. A video processor is coupled to a first camera and a second camera. The video processor combines video generated from the first camera and video generated from the second camera to generate live video that includes video of scenes behind the pole, and wherein the image analyzer determines whether there exists a potential traffic hazard, traffic issue or safety issue based on the generated live video that includes video of scenes behind the pole of the streetlamp.

Figure 10:
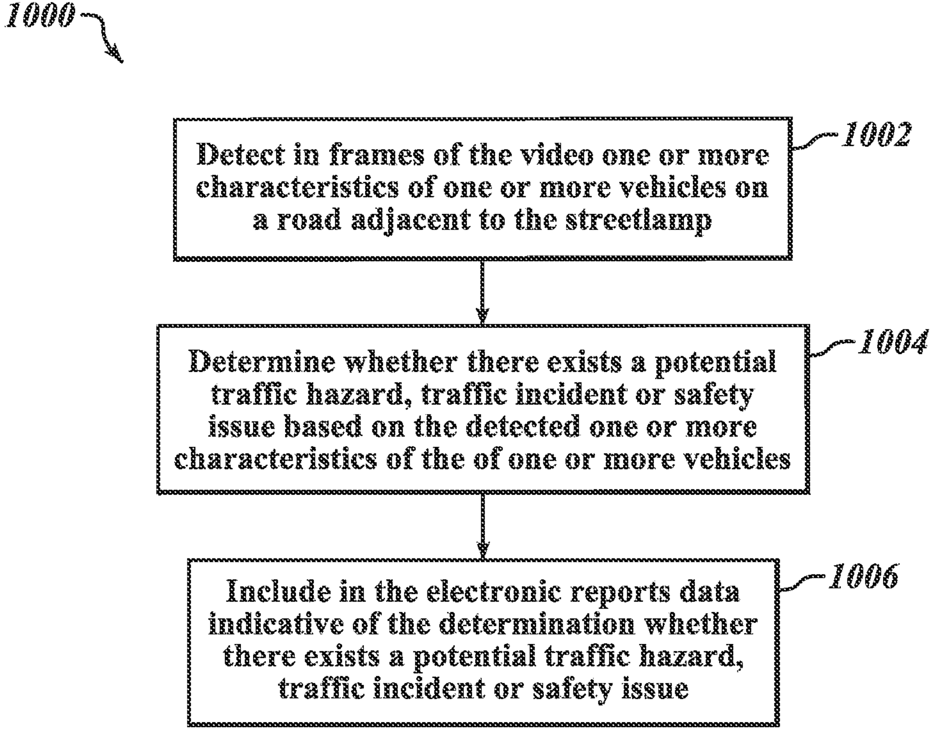
FIG. 10 is a flow diagram of an example method in a vehicle traffic monitoring device system, useful in the method of FIG. 9, for determining whether there exists a potential traffic hazard, traffic issue or safety issue, according to one non-limiting embodiment.

FIG. 10 is a flow diagram of an example method 1000 in a vehicle traffic monitoring device system, useful in the method 900 of FIG. 9, for determining whether there exists a potential traffic hazard, traffic issue or safety issue, according to one non-limiting embodiment.

At 1002, an image analyzer of a vehicle traffic monitoring device detects in frames of the video one or more characteristics of one or more vehicles on a road adjacent to the streetlamp.

At 1004, the image analyzer determines whether there exists a potential traffic hazard, traffic issue or safety issue based on the detected one or more characteristics of the of one or more vehicles.

At 1006, the image analyzer includes in the electronic reports data indicative of the determination whether there exists a potential traffic hazard, traffic issue or safety issue.

Figure 11:
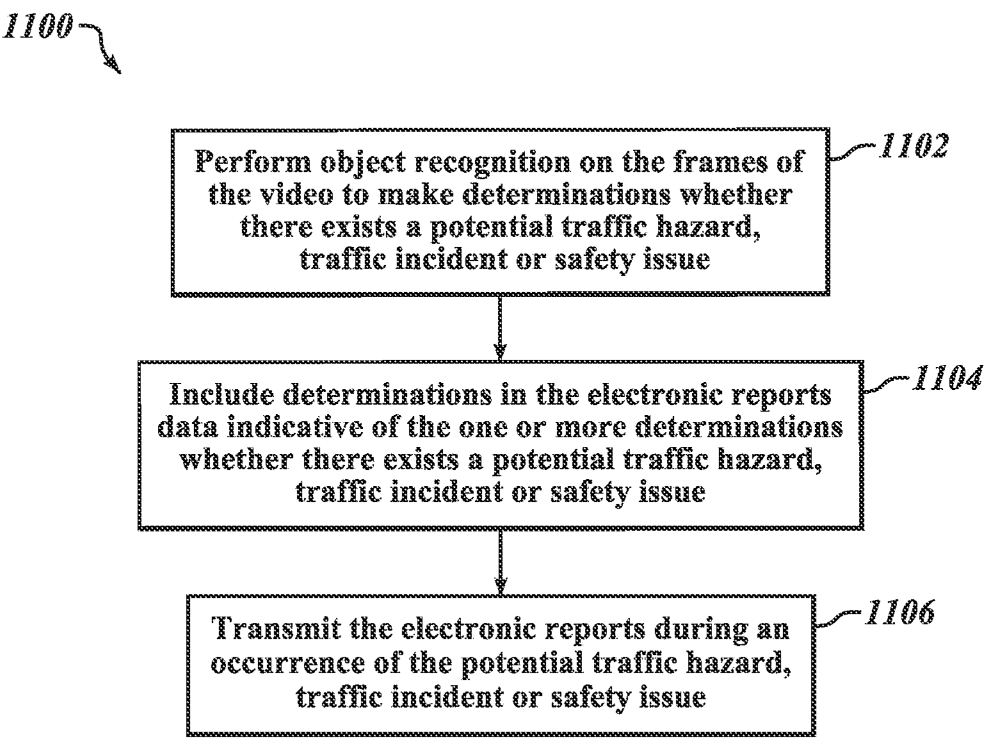
FIG. 11 is a flow diagram of an example method in a vehicle traffic monitoring device system, useful in the method of FIG. 9, for transmitting electronic reports during an occurrence of the potential traffic hazard, traffic issue or safety issue, according to one non-limiting embodiment.

FIG. 11 is a flow diagram of an example method 1100 in a vehicle traffic monitoring device system, useful in the method 900 of FIG. 9, for transmitting electronic reports during an occurrence of the potential traffic hazard, traffic issue or safety issue, according to one non-limiting embodiment.

At 1102, the image analyzer performs object recognition on the frames of the video using computer vision techniques to make one or more determinations whether there exists a potential traffic hazard, traffic issue or safety issue based on the video.

At 1104, the image analyzer includes determinations in the electronic reports data indicative of the one or more determinations whether there exists a potential traffic hazard, traffic issue or safety issue based on the video.

At 1106, the wireless cellular network connection module transmits the electronic reports during an occurrence of the potential traffic hazard, traffic issue or safety issue.

Figure 12:
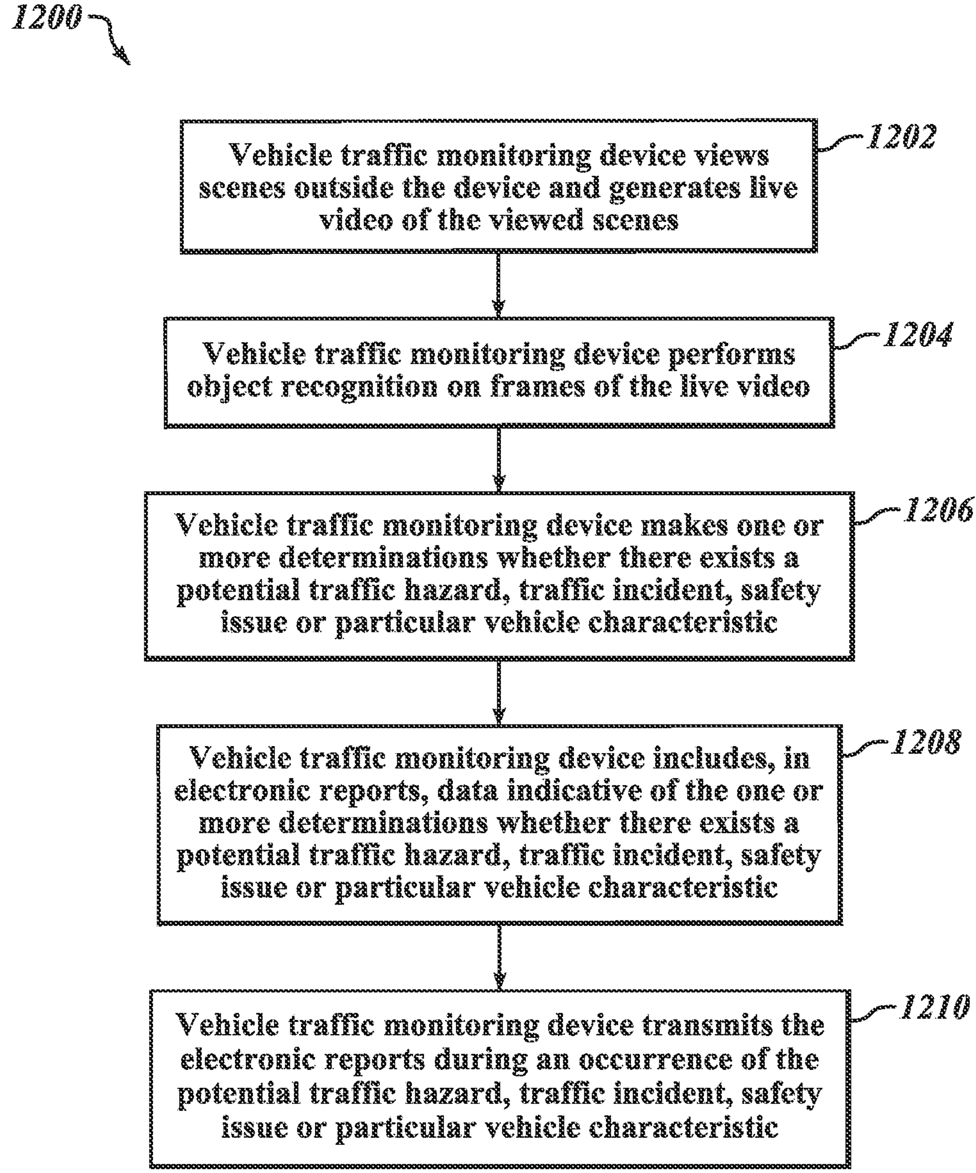
FIG. 12 is a flow diagram of an example method in a vehicle traffic monitoring device system for autonomously monitoring traffic on a road, according to one non-limiting embodiment.

FIG. 12 is a flow diagram of an example method 1200 in a vehicle traffic monitoring device system for autonomously monitoring traffic on a road, according to one non-limiting embodiment.

At 1202, a vehicle traffic monitoring device views scenes outside the device and generates live video of the viewed scenes in at least a high-definition (HD) resolution.

At 1204, the vehicle traffic monitoring device performs object recognition on frames of the live video in real time using computer vision techniques. For example, the vehicle traffic monitoring device may detect a potential traffic hazard, traffic issue, safety issue or particular vehicle characteristic based on the object detection recognizing in the frames of the generated live video one or more incidents on or near the road in real-time while the incident is occurring. The incident may include, but is not limited to, one or more of: a traffic accident; a traffic collision; a road hazard; debris in the road; a hole in the road; a large crack, bump or missing pavement in the road; pooling water in the road; pieces of tire in the road; an oversized vehicle on the road; fog; rain; snow, sleet; hail; precipitation; inclement weather; a flood; high winds; a tornado; a storm; lightening; thunder; ice; reckless driving; speeding; a stalled vehicle; a roadblock; construction; one or more people approaching the road; one or more people in, on or near the road; an active shooter; one or more animals approaching the road; one or more animals in, on or near the road; a fire; one or more emergency vehicles; a vehicle pile-up; emergency vehicle lights flashing, a barricade; a traffic stop; a sign indicating a traffic issue or road condition; a speed trap; a police vehicle; an incident on a side of the road, etc.

In an example embodiment, the vehicle traffic monitoring device may determine that a detected potential traffic hazard, traffic issue, safety issue or particular vehicle characteristic is a root cause of traffic congestion on a road depicted in the generated live video captured by a camera of the vehicle traffic monitoring device based on the object detection, and wherein the alert indicates the determined root cause of traffic congestion.

At 1206, the vehicle traffic monitoring device makes one or more determinations whether there exists a potential traffic hazard, traffic issue, safety issue or particular vehicle characteristic based on the object recognition.

At 1208, the vehicle traffic monitoring device includes, in electronic reports, data indicative of the one or more determinations whether there exists a potential traffic hazard, traffic issue, safety issue or particular vehicle characteristic based on generated live video.

At 1210, the vehicle traffic monitoring device transmits the electronic reports during an occurrence of the potential traffic hazard, traffic issue, safety issue or particular vehicle characteristic via a wireless cellular network connection module of the vehicle traffic monitoring device. In an example embodiment, the vehicle traffic monitoring device may stream the generated live video via the wireless cellular network connection module of the vehicle traffic monitoring device in real-time at no less than 24 frames per second, with at least about a 15 Mbps data rate and with a latency rate no greater than about than 50 milliseconds. Also, in response to determining there exists a potential traffic hazard, traffic issue, safety issue or particular vehicle characteristic, the vehicle traffic monitoring device may cause an alert to be generated for one or more drivers of one or more vehicles determined to be potentially affected by the potential traffic hazard, traffic issue, safety issue or particular vehicle characteristic.

Figure 13:
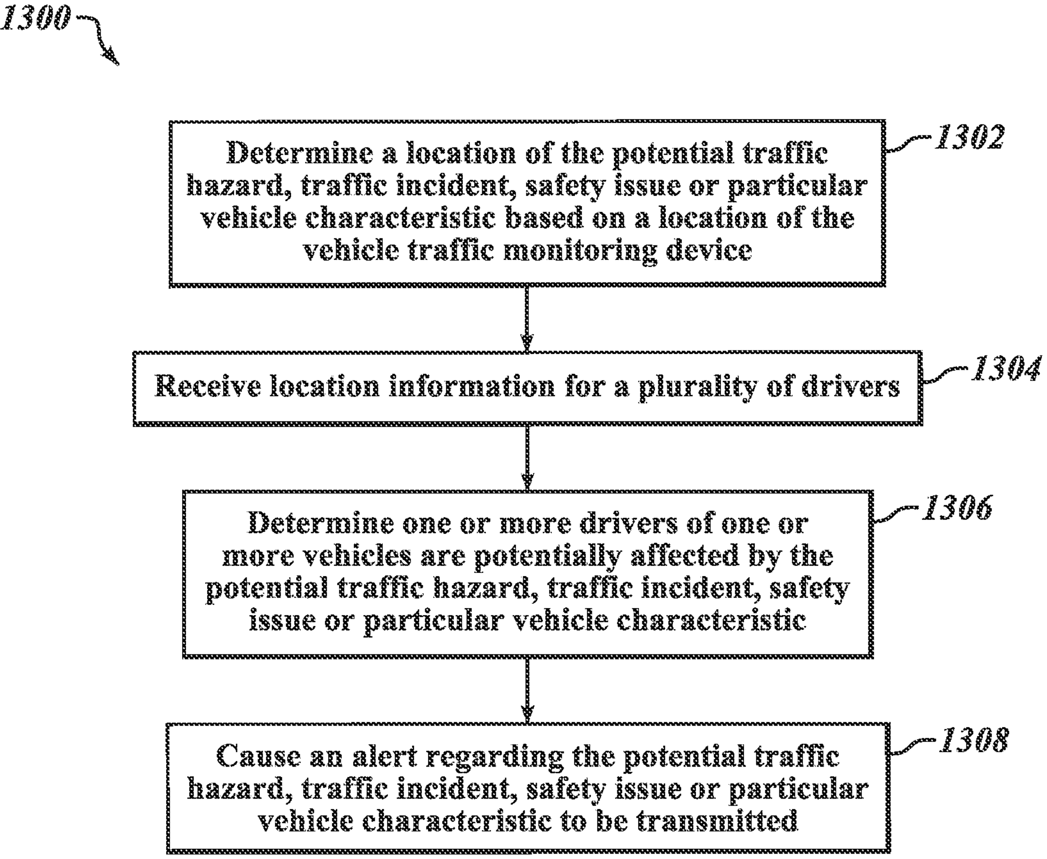
FIG. 13 is a flow diagram of an example method in a vehicle traffic monitoring device system, useful in the method of FIG. 12, for causing an alert regarding a potential traffic hazard, traffic issue, safety issue or particular vehicle characteristic to be transmitted, according to one non-limiting embodiment.

FIG. 13 is a flow diagram of an example method 1300 in a vehicle traffic monitoring device system, useful in the method 1200 of FIG. 12, for causing an alert regarding a potential traffic hazard, traffic issue, safety issue or particular vehicle characteristic to be transmitted, according to one non-limiting embodiment.

At 1302, the vehicle traffic monitoring device system determines a location of the potential traffic hazard, traffic issue, safety issue or particular vehicle characteristic based on a location of the vehicle traffic monitoring device that made the determination whether there exists the potential traffic hazard, traffic issue, safety issue or particular vehicle characteristic based on the generated live video.

At 1304, the vehicle traffic monitoring device system receives location information for a plurality of drivers.

At 1306, the vehicle traffic monitoring device system determines, based on the received location information, the one or more drivers of one or more vehicles are potentially affected by the potential traffic hazard, traffic issue, safety issue or particular vehicle characteristic based on a proximity of each of the one or more drivers to a location of the potential traffic hazard, traffic issue, safety issue or particular vehicle characteristic.

At 1308, the vehicle traffic monitoring device system causes an alert regarding the potential traffic hazard, traffic issue, safety issue or particular vehicle characteristic to be transmitted, via wireless cellular network connection module of the vehicle traffic monitoring device or one or more other vehicle traffic monitoring devices within a selectable distance from the determined location of the potential traffic hazard, traffic issue, safety issue or particular vehicle characteristic, to the one or more drivers of one or more vehicles determined to be potentially affected by the potential traffic hazard, traffic issue, safety issue or particular vehicle characteristic.

In an example embodiment, the alert includes information indicating an approximate distance from the driver to the potential traffic hazard, traffic issue, safety issue or particular vehicle characteristic based on the received receiving location information. The potential traffic hazard, traffic issue, safety issue or particular vehicle characteristic may include, but is not limited to, one or more animals approaching or on the road and the alert includes information indicating an approximate distance from the driver to the one or more animals approaching or on the road.

In an example embodiment, the alert is transmitted, via wireless cellular network connection module of the vehicle traffic monitoring device or one or more other vehicle traffic monitoring devices within a selectable distance from the determined location of the potential traffic hazard, traffic issue, safety issue or particular vehicle characteristic, to respective mobile devices of the one or more drivers determined, based on the received location information, to be in a vehicle on the road and within a threshold proximity to the potential traffic hazard, traffic issue, safety issue or particular vehicle characteristic. The threshold proximity may be specific to each driver of the one or more drivers based on an estimated speed the driver is currently traveling. The alert may be transmitted, via wireless cellular network connection module of the vehicle traffic monitoring device or one or more other vehicle traffic monitoring devices within a selectable distance from the determined location of the potential traffic hazard, traffic issue, safety issue or particular vehicle characteristic, to respective vehicles of the one or more drivers determined, based on the received location information, to be within a threshold proximity to the potential traffic hazard, traffic issue, safety issue or particular vehicle characteristic.

In an example embodiment, the alert is a notification or information appearing within an interface or map of a navigation application running on respective mobile devices or respective vehicle infotainment systems of respective vehicles of the one or more drivers. In some embodiments, the alert includes a live video stream of the potential traffic hazard, traffic issue, safety issue or particular vehicle characteristic, the live video stream originating from the vehicle traffic monitoring device and transmitted via the wireless cellular network connection module of the vehicle traffic monitoring device.

Figure 14:
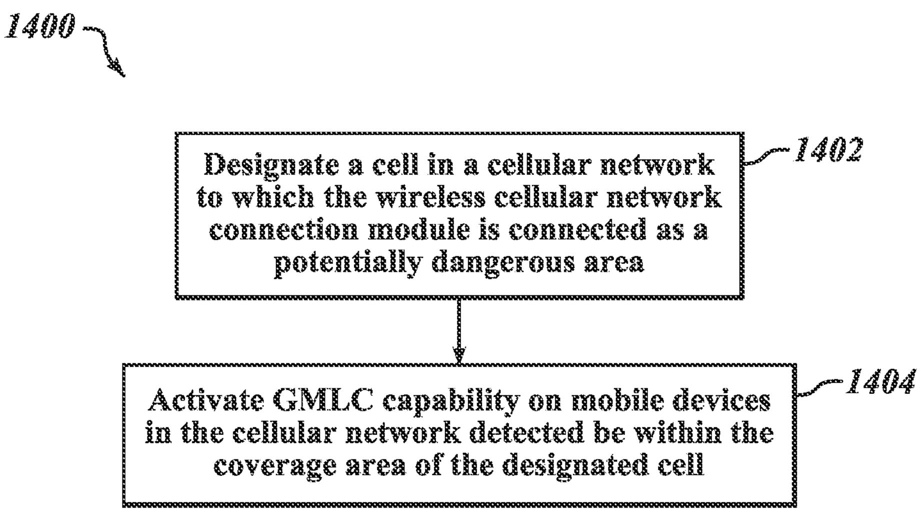
FIG. 14 is a flow diagram of an example method in a vehicle traffic monitoring device system, useful in the method of FIG. 13, for receiving location information, according to one non-limiting embodiment.

FIG. 14 is a flow diagram of an example method 1400 in a vehicle traffic monitoring device system, useful in the method 1300 of FIG. 13, for receiving location information, according to one non-limiting embodiment.

At 1402, the vehicle traffic monitoring device system designates a cell in a cellular network to which the wireless cellular network connection module is connected as a potentially dangerous area based on the determined location of the potential traffic hazard, traffic issue, safety issue or particular vehicle characteristic being with the coverage area of the cell.

At 1404, in response to the designating the cell as a potentially dangerous area, the vehicle traffic monitoring device system activates GMLC capability on mobile devices in the cellular network detected be within the coverage area of the designated cell in order to receive the data associated with respective vehicles or mobile devices of the plurality of drivers.

In an example embodiment, the vehicle traffic monitoring device is integrated into a streetlamp and is controlled by a mobile network operator of a cellular network to which the wireless cellular network connection module is connected.

Figure 15:
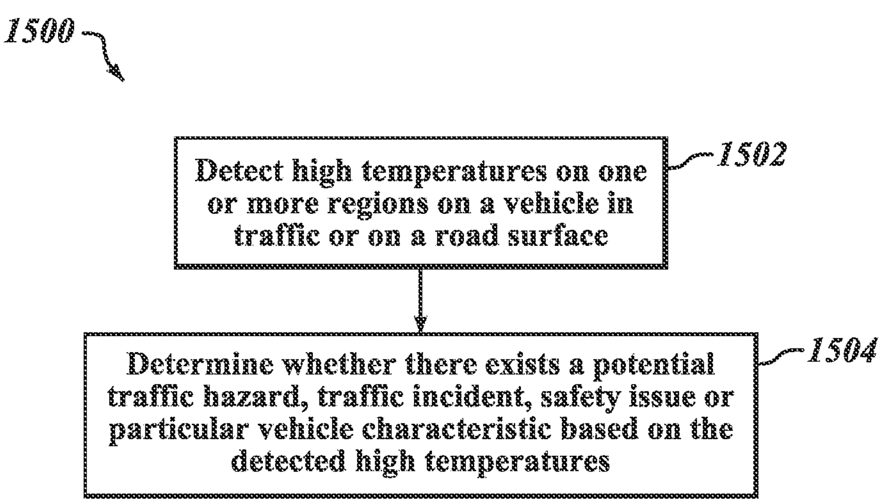
FIG. 15 is a flow diagram of an example method in a vehicle traffic monitoring device system, useful in the method of FIG. 12, for determining whether there exists a potential traffic hazard, traffic issue, safety issue or particular vehicle characteristic based on detected high temperatures on the vehicle, according to one non-limiting embodiment.

FIG. 15 is a flow diagram of an example method 1500 in a vehicle traffic monitoring device system, useful in the method 1200 of FIG. 12, for determining whether there exists a potential traffic hazard, traffic issue, safety issue or particular vehicle characteristic based on detected high temperatures on the vehicle, according to one non-limiting embodiment.

At 1502, the vehicle traffic monitoring device may detect high temperatures on one or more regions on a vehicle in traffic or on a road surface based on analyzing infrared (IR) images from one or more IR cameras along with corresponding non-IR images comprising the generated live video.

At 1504, the vehicle traffic monitoring device may then determine whether there exists a potential traffic hazard, traffic issue, safety issue or particular vehicle characteristic based on the detected high temperatures on one or more regions on the vehicle in traffic. In an example embodiment, the vehicle traffic monitoring device may detect overheating of brakes of the vehicle in traffic based on the detected high temperatures on one or more regions on the vehicle in traffic; detect overheating of an engine of the vehicle in traffic based on the detected high temperatures on one or more regions on the vehicle in traffic; and/or detect overheating of one or more tires of the vehicle in traffic based on the detected high temperatures on one or more regions on the vehicle in traffic.

Figure 16:
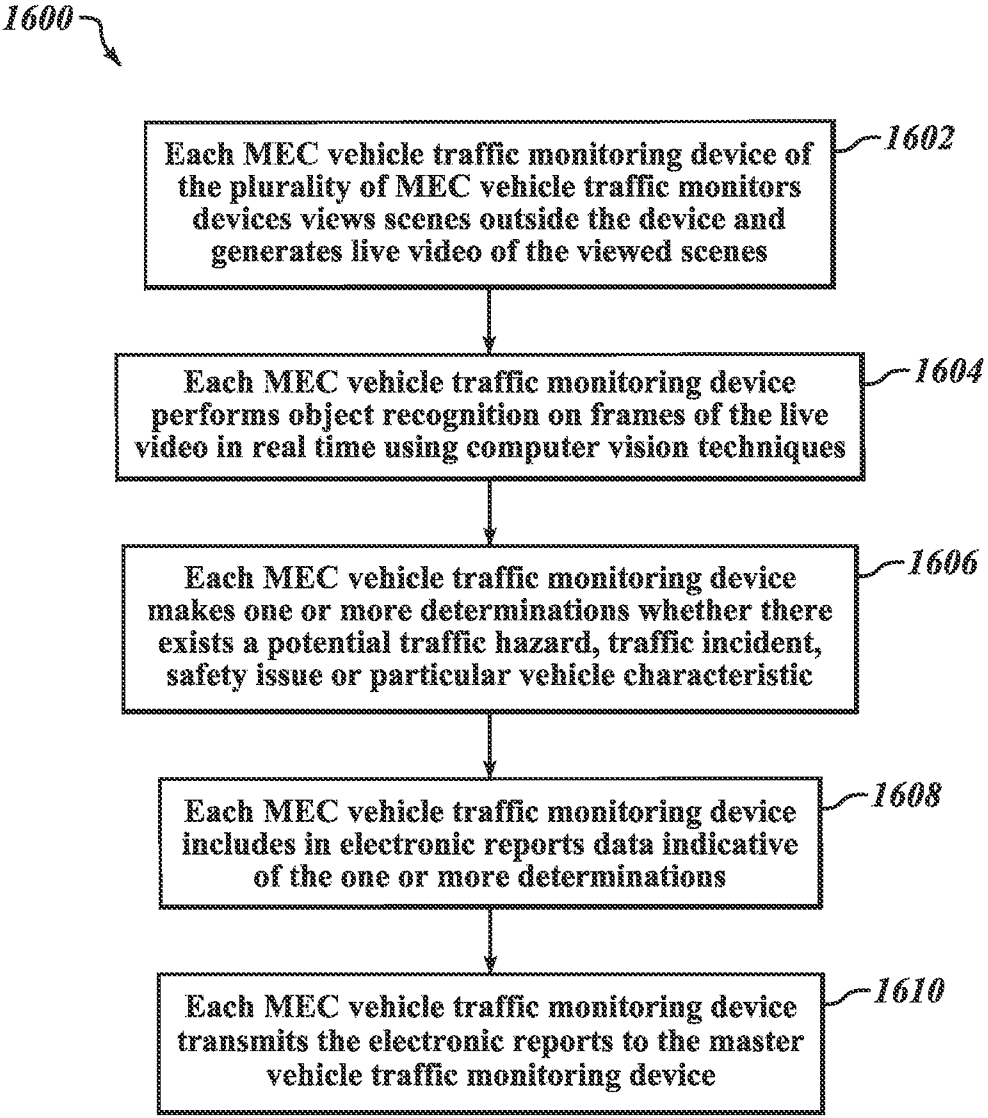
FIG. 16 is a flow diagram of an example method in a vehicle traffic monitoring device system that includes a plurality of multi-access edge computing (MEC) vehicle traffic monitoring devices, according to one non-limiting embodiment.

FIG. 16 is a flow diagram of an example method 1600 in a vehicle traffic monitoring device system that includes a plurality of multi-access edge computing (MEC) vehicle traffic monitoring devices, according to one non-limiting embodiment. Method 1600 may operate in a vehicle traffic monitoring system comprising a plurality of multi-access edge computing (MEC) vehicle traffic monitoring devices. The vehicle traffic monitoring system may include a master vehicle traffic monitoring device to which each MEC vehicle traffic monitoring device of the plurality of MEC vehicle traffic monitoring devices is communicatively connected via a wireless cellular network on which the plurality of MEC vehicle traffic monitoring devices and the master vehicle traffic monitoring device are present, wherein the master vehicle traffic monitoring device is communicatively connected to a core network of the wireless cellular network At 1602, each respective MEC vehicle traffic monitoring device of the plurality of MEC vehicle traffic monitoring devices views scenes outside the device and generates live video of the viewed scenes in at least a high-definition (HD) resolution;

At 1604, each respective MEC vehicle traffic monitoring device of the plurality of MEC vehicle traffic monitoring devices performs object recognition on frames of the live video in real time using computer vision techniques;

At 1606, each respective MEC vehicle traffic monitoring device of the plurality of MEC vehicle traffic monitoring devices makes one or more determinations whether there exists a potential traffic hazard, traffic issue, safety issue or particular vehicle characteristic based on the object recognition;

At 1608, each respective MEC vehicle traffic monitoring device of the plurality of MEC vehicle traffic monitoring devices includes in electronic reports data indicative of the one or more determinations whether there exists a potential traffic hazard, traffic issue, safety issue or particular vehicle characteristic based on the generated live video; and At 1610, each respective MEC vehicle traffic monitoring device of the plurality of MEC vehicle traffic monitoring devices transmits the electronic reports to the master vehicle traffic monitoring device during an occurrence of the potential traffic hazard, traffic issue, safety issue or particular vehicle characteristic via a wireless cellular network connection module of the vehicle traffic monitoring device.

In an example embodiment, each respective MEC vehicle traffic monitoring device of the plurality of MEC vehicle traffic monitoring devices, based on a determination whether to stream the generated live video to the master vehicle traffic monitoring device, streams the generated live video to the master vehicle traffic monitoring device via the wireless cellular network connection module of the respective MEC vehicle traffic monitoring device in real-time at no less than 24 frames per second, with at least about a 15 Mbps data rate and with a latency rate no greater than about than 50 milliseconds.

Figure 17:
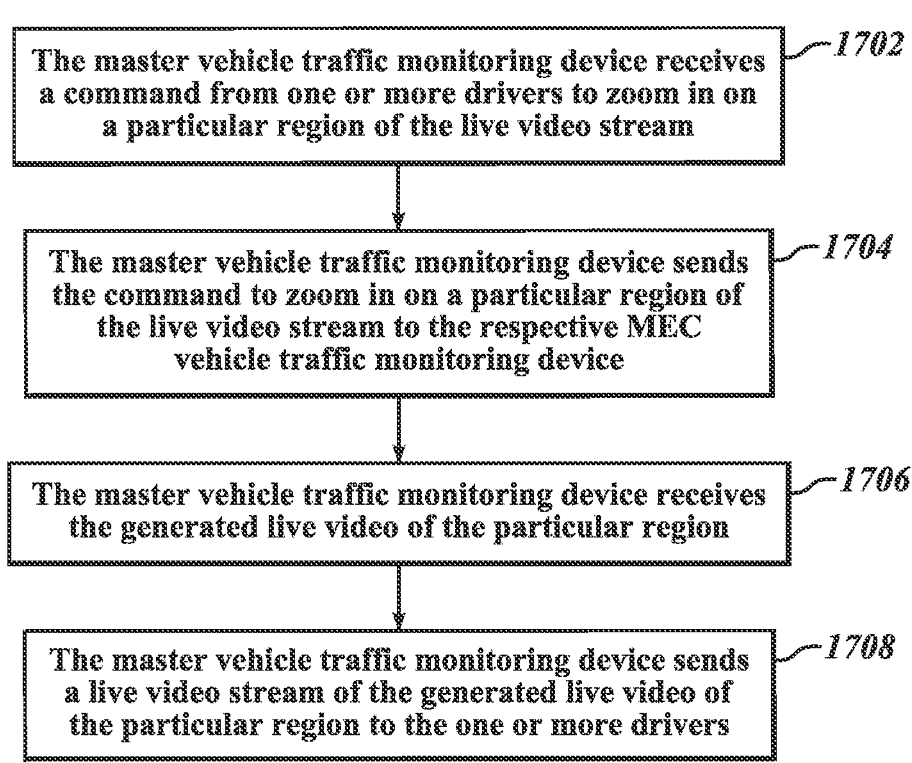
FIG. 17 is a flow diagram of an example method in a vehicle traffic monitoring device system, useful in the method of FIG. 16, for sending a live video stream, according to one non-limiting embodiment.

FIG. 17 is a flow diagram of an example method 1700 in a vehicle traffic monitoring device system, useful in the method 1600 of FIG. 16, for sending a live video stream, according to one non-limiting embodiment.

At 1702, the master vehicle traffic monitoring device receives a command from one or more drivers of the one or more vehicles determined to be potentially affected by the potential traffic hazard, traffic issue, safety issue or particular vehicle characteristic to zoom in on a particular region of the live video stream.

At 1704, the master vehicle traffic monitoring device sends the command to zoom in on a particular region of the live video stream to the respective MEC vehicle traffic monitoring device from which the generated live video of the potential traffic hazard, traffic issue, safety issue or particular vehicle characteristic originated.

At 1706, the master vehicle traffic monitoring device receives, in response to the sent command, generated live video of the particular region from the respective MEC vehicle traffic monitoring device.

At 1708, the master vehicle traffic monitoring device sends a live video stream of the received generated live video of the particular region via the core network of the wireless cellular network to the one or more drivers from which the command was received.

Figure 18:
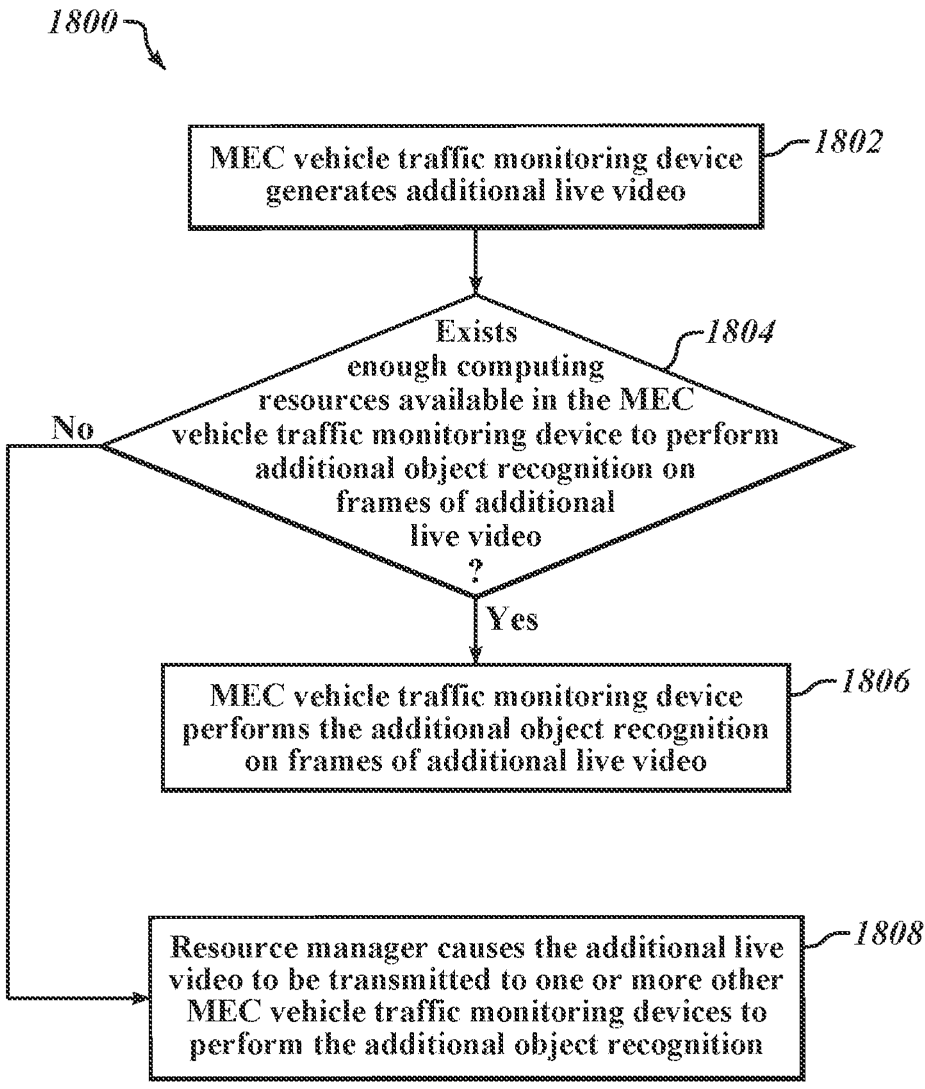
FIG. 18 is a flow diagram of an example method in a vehicle traffic monitoring device system, useful in the method of FIG. 16, for utilizing a resource manager, according to one non-limiting embodiment.

FIG. 18 is a flow diagram of an example method 1800 in a vehicle traffic monitoring device system, useful in the method 1600 of FIG. 16, for utilizing a resource manager, according to one non-limiting embodiment.

At 1802, the MEC vehicle traffic monitoring device performs additional object recognition on frames of additional live video in real time using computer vision techniques.

At 1804 the resource manager of the MEC vehicle traffic monitoring device determines whether there exists enough computing resources available in the vehicle traffic monitoring device to perform additional object recognition on frames of additional live video in real time using computer vision techniques and make one or more additional determinations whether there exists a potential traffic hazard, traffic issue, safety issue or particular vehicle characteristic based on the additional object recognition. If it is determined there does not exist enough computing resources available to perform additional object recognition or make one or more additional determinations whether there exists a potential traffic hazard, traffic issue, safety issue or particular vehicle characteristic, then the method 1800 proceeds to 1808. Otherwise, the method proceeds to 1806.

At 1806, the resource manager causes the vehicle traffic monitoring device to perform additional object recognition on frames of the additional live video in real time using computer vision techniques and to make one or more additional determinations whether there exists a potential traffic hazard, traffic issue, safety issue or particular vehicle characteristic based on the additional object recognition.

At 1808, the resource manager causes the additional live video to be transmitted to one or more other respective MEC vehicle traffic monitoring devices of the plurality of MEC vehicle traffic monitoring devices to perform the additional object recognition and the making one or more additional determinations. The resource manager included in the respective MEC vehicle traffic monitoring device may cause the additional live video to be transmitted to one or more other respective MEC vehicle traffic monitoring devices of the plurality of MEC vehicle traffic monitoring devices by transmitting the additional live video to the master vehicle traffic monitoring device for the master vehicle traffic monitoring device to transmit to the one or more other respective MEC vehicle traffic monitoring devices.

Figure 19:
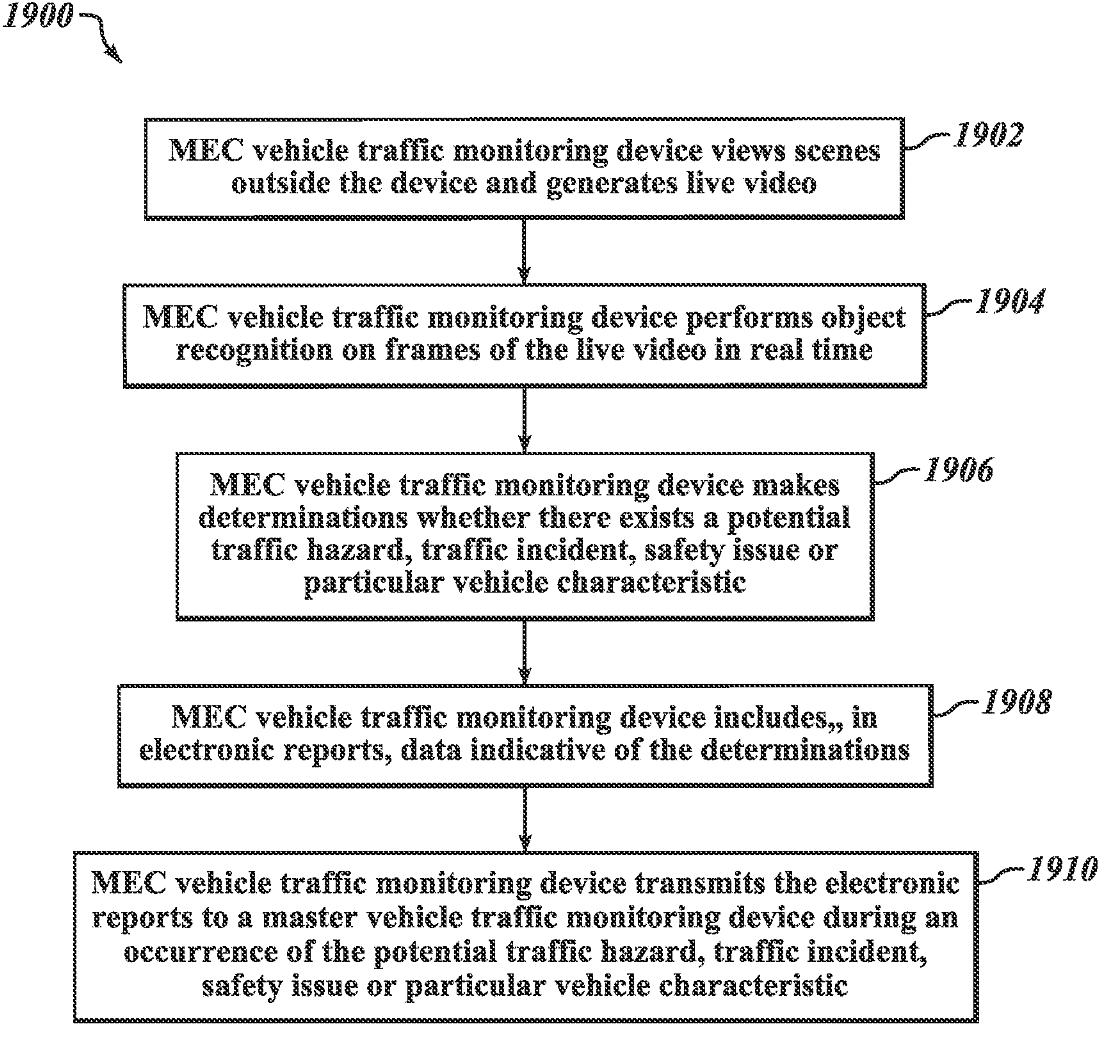
FIG. 19 is a flow diagram of an example method in a particular multi-access edge computing (MEC) vehicle traffic monitoring device, according to one non-limiting embodiment.

FIG. 19 is a flow diagram of an example method 1900 in a particular MEC vehicle traffic monitoring device, according to one non-limiting embodiment. In an example embodiment, the method 1900 may be performed by each respective MEC vehicle traffic monitoring device of a plurality of MEC vehicle traffic monitoring devices in a vehicle traffic monitoring system 802 such as that shown in FIG. 8.

At 1902, the MEC vehicle traffic monitoring device views scenes outside the device and generating live video of the viewed scenes in at least a high-definition (HD) resolution.

At 1904, the MEC vehicle traffic monitoring device performs object recognition on frames of the live video in real time using computer vision techniques.

At 1906, the MEC vehicle traffic monitoring device makes one or more determinations whether there exists a potential traffic hazard, traffic issue, safety issue or particular vehicle characteristic based on the object recognition.

At 1908, the MEC vehicle traffic monitoring device includes in electronic reports data indicative of the one or more determinations whether there exists a potential traffic hazard, traffic issue, safety issue or particular vehicle characteristic based on the generated live video.

At 1910, the MEC vehicle traffic monitoring device transmits the electronic reports to a master vehicle traffic monitoring device during an occurrence of the potential traffic hazard, traffic issue, safety issue or particular vehicle characteristic via a wireless cellular network connection module of the vehicle traffic monitoring device. The master vehicle traffic monitoring device may be connected to each MEC vehicle traffic monitoring device of the plurality of MEC vehicle traffic monitoring devices via a wireless cellular network on which the plurality of MEC vehicle traffic monitoring devices and the master vehicle traffic monitoring device are present. The master vehicle traffic monitoring device may be communicatively connected to a core network of the wireless cellular network.

In an example embodiment, based on a determination whether to stream the generated live video to the master vehicle traffic monitoring device, the MEC vehicle traffic monitoring device may stream the generated live video to the master vehicle traffic monitoring device via the wireless cellular network connection module of the respective MEC vehicle traffic monitoring device in real-time at no less than 24 frames per second, with at least about a 15 Mbps data rate and with a latency rate no greater than about than 50 milliseconds. The master vehicle traffic monitoring device may determine whether to have the generated live video streamed to the master vehicle traffic monitoring device based on the received electronic reports from the MEC vehicle traffic monitoring device.

Figure 20:
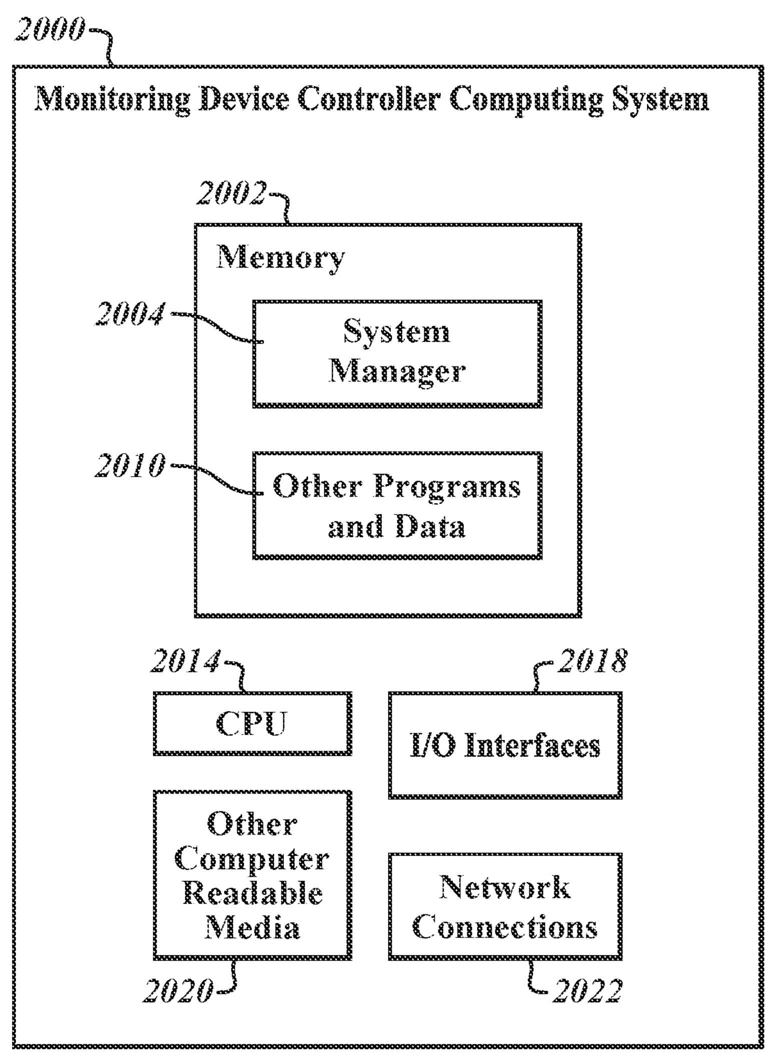
FIG. 20 shows a system diagram that describes an example implementation of a computing system(s) for implementing embodiments described herein.

FIG. 20 shows a system diagram that describes an example implementation of a computing system(s) for implementing embodiments described herein. For example, the example implementation of the computing system 2000 in FIG. 20 may be that of the monitoring device controller 210 of FIG. 10.

The functionality described herein for vehicle traffic monitoring device systems and methods, or components thereof, can be implemented either on dedicated hardware, as a software instance running on dedicated hardware, or as a virtualized function instantiated on an appropriate platform, e.g., a cloud infrastructure. In some embodiments, some components of such functionality may be completely software-based and designed as cloud-native, meaning that they're agnostic to the underlying cloud infrastructure, allowing higher deployment agility and flexibility. However, FIG. 20 illustrates an example of underlying hardware on which such software and functionality may be hosted and/or implemented.

In particular, shown is example host computer system(s) 2000. For example, such computer system(s) 2000 may represent those in various streetlamps and respective vehicle traffic monitoring devices shown and/or described herein that host the functions, components, microservices and other aspects described herein to implement vehicle traffic monitoring device systems and methods. In some embodiments, one or more special-purpose computing systems may be used to implement the functionality described herein. Accordingly, various embodiments described herein may be implemented in software, hardware, firmware, or in some combination thereof. Host computer system(s) 2000 may include memory 2002, one or more central processing units (CPUs) 2014, I/O interfaces 2018, other computer-readable media 2020, and network connections 2022.

Memory 2002 may include one or more various types of non-volatile and/or volatile storage technologies. Examples of memory 2002 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 2002 may be utilized to store information, including computer-readable instructions that are utilized by CPU 2014 to perform actions, including those of embodiments described herein.

Memory 2002 may have stored thereon system manager 2004. The system manager 2004 may be configured to implement and/or perform some or all of the functions of the systems, components and modules described herein for vehicle traffic monitoring device systems and methods. Memory 2002 may also store other programs and data 2010, which may include rules, databases, application programming interfaces (APIs), software platforms, cloud computing service software, intelligence layer software, network management software, network orchestrator software, network functions (NF), AI or ML programs or models to perform the functionality described herein, user interfaces, operating systems, other network management functions, other NFs, etc.

Network connections 2022 are configured to communicate with other computing devices to facilitate the functionality described herein. In various embodiments, the network connections 2022 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 2018 may include video interfaces, other data input or output interfaces, or the like. Other computer-readable media 2020 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A vehicle traffic monitoring device comprising:

a device housing;

at least one video camera in the device housing that views scenes outside the device housing and generates live video of the viewed scenes in at least a high-definition (HD) resolution;

an image analyzer in the device housing that generates electronic reports regarding frames of the live video based on local analytics performed by the image analyzer;

a wireless cellular network connection module in the device housing that is configured to stream the generated live video via the wireless cellular network connection module to, and transmit the electronic reports generated by the image analyzer to, a remote mobile device based on detected proximity of the remote mobile device to a potential traffic hazard, traffic issue or safety issue;

a controller in the device housing, the controller comprising at least one processor and coupled to the at least one video camera, the image analyzer and the wireless cellular network connection module; and at least one memory in the device housing and coupled to the at least one processor, wherein the at least one memory has computer-executable instructions stored thereon that, when executed by the at least one processor, cause the at least one processor to cause the vehicle traffic monitoring device to perform functions of the vehicle traffic monitoring device.

2. The vehicle traffic monitoring device of claim 1 wherein the wireless cellular network connection module is configured to stream the generated live video via the wireless cellular network connection module at a rate of at least about 15 Mbps.

3. The vehicle traffic monitoring device of claim 1 wherein the wireless cellular network connection module is configured to stream the generated live video via the wireless cellular network connection module at a rate of at least about 1 Gbps.

4. The vehicle traffic monitoring device of claim 1 wherein the wireless cellular network connection module is configured to stream the generated live video via the wireless cellular network connection module at a rate of at least about 10 Gbps.

5. The vehicle traffic monitoring device of claim 1 wherein the wireless cellular network connection module is a fifth generation (5G) cellular network connection module.

6. The vehicle traffic monitoring device of claim 1 wherein the at least one video camera includes a 360° video camera.

7. The vehicle traffic monitoring device of claim 1 wherein the vehicle traffic monitoring device is integrated into a streetlamp that is on a substantially vertical pole.

8. The vehicle traffic monitoring device of claim 7 wherein the image analyzer:

detects in frames of the live video one or more characteristics of one or more vehicles on a road adjacent to the streetlamp;

determines whether there exists a potential traffic hazard, traffic issue or safety issue based on the detected one or more characteristics of the one or more vehicles; and includes in the electronic reports data indicative of the determination whether there exists a potential traffic hazard, traffic issue or safety issue.

9. The vehicle traffic monitoring device of claim 7 wherein the at least one video camera includes an infrared video camera and the generated live video comprises infrared video frames.

10. The vehicle traffic monitoring device of claim 9 wherein the image analyzer:

detects in frames of the live video a heat signature of one or more characteristics of one or more vehicles on a road adjacent to the streetlamp;

determines whether there exists a potential traffic hazard, traffic issue or safety issue based on the detected heat signature of the one or more characteristics of the one or more vehicles; and includes in the electronic reports data indicative of the determination whether there exists a potential traffic hazard, traffic issue or safety issue.

11. The vehicle traffic monitoring device of claim 7 wherein:

the at least one video camera includes a first camera positioned under the streetlamp with a field of vision around the streetlamp on one side of the pole and a second camera positioned under the streetlamp with a field of vision around the streetlamp on the other side of the pole such that the generated live video includes video of scenes behind the pole.

12. The vehicle traffic monitoring device of claim 11, further comprising:

a video processor coupled to the first camera and the second camera, wherein the video processor combines video generated from the first camera and video generated from the second camera to generate live video that includes video of scenes behind the pole, and wherein the image analyzer determines whether there exists a potential traffic hazard, traffic issue or safety issue based on the generated live video that includes video of scenes behind the pole of the streetlamp.

13. The vehicle traffic monitoring device of claim 11, further comprising:

a video processor coupled to the first camera and the second camera, wherein the video processor combines stereoscopic frames from video generated from the first camera and from video generated from the second camera to generate a three-dimensional (3D) model of scenes around the pole of the streetlamp, and wherein the image analyzer determines whether there exists a potential traffic hazard, traffic issue or safety issue based on the 3D model of scenes around the pole of the streetlamp.

14. The vehicle traffic monitoring device of claim 1, wherein:

the image analyzer performs object recognition on the frames of the live video using computer vision techniques to make one or more determinations whether there exists a potential traffic hazard, traffic issue or safety issue based on the live video;

the image analyzer includes determinations in the electronic reports data indicative of the one or more determinations whether there exists a potential traffic hazard, traffic issue or safety issue based on the live video; and the wireless cellular network connection module transmits the electronic reports during an occurrence of the potential traffic hazard, traffic issue or safety issue.

15. The vehicle traffic monitoring device of claim 14, wherein:

the image analyzer determines there exists a potential traffic hazard, traffic issue or safety issue existing within a particular region of the frames of the live video; and in response to the determination made by the image analyzer, the image analyzer selects the particular region of the frames of the live video in which the potential traffic hazard, traffic issue or safety issue is determined to exist to transmit in real time via the wireless cellular network connection module.

16. The vehicle traffic monitoring device of claim 15, wherein:

the image analyzer selects the particular region of the frames of the live video in which the potential traffic hazard, traffic issue or safety issue is determined to exist to have one or more cameras of the at least one video camera zoom in on a scene identified by the particular region;

based on the determination made by the image analyzer, the controller causes one or more cameras of the at least one video camera to zoom in on the scene identified by the particular region; and the wireless cellular network connection module streams live video generated by the one or more cameras of the at least one video camera zoomed in on the scene identified by the particular region.

17. The vehicle traffic monitoring device of claim 1, further comprising:

one or more sensors coupled to the controller that provide data to the image analyzer, wherein the image analyzer uses the data provided by the one or more sensors in combination with the frames of the live video to determine whether there exists a potential traffic hazard, traffic issue or safety issue on or near a road in proximity to the vehicle traffic monitoring device.

18. The vehicle traffic monitoring device of claim 17 wherein the one or more sensors include one or more of: a microphone; a thermometer; a rain sensor; a fog sensor; a barometer; a humidity sensor; a wind speed sensor; a heat signature sensor; an infrared sensor; a night vision sensor; a smoke detector; a fire detector; a proximity sensor; a light sensor; a pressure detector; a gas detector; a carbon dioxide sensor; an ultrasonic sensor; a color sensor; an accelerometer; a tilt sensor; a Light Detection and Ranging (LiDAR) device; a radar sensor; a speed detector for a sensed object; a position sensor; a global positioning system (GPS) device; and a photo optic sensor.

19. A method comprising:

at least one video camera in a device housing of a vehicle traffic monitoring device, the at least one video camera viewing scenes outside the device housing and generating live video of the viewed scenes in at least a high-definition (HD) resolution;

an image analyzer in the device housing performing local analytics of the live video;

the image analyzer generating electronic reports regarding frames of the live video based on the local analytics performed by the image analyzer;

a wireless cellular network connection module in the device housing streaming the generated live video via the wireless cellular network connection module to a remote mobile device based on detected proximity of the remote mobile device to a potential traffic hazard, traffic issue of safety issue; and the wireless cellular network connection module transmitting the electronic reports regarding the frames generated by the image analyzer to the remote mobile device based on detected proximity of the remote mobile device to a potential traffic hazard, traffic issue or safety issue.

20. The method of claim 19, further comprising:

the image analyzer detecting in frames of the live video one or more characteristics of one or more vehicles on a road adjacent to the vehicle traffic monitoring device;

the image analyzer determining whether there exists a potential traffic hazard, traffic issue or safety issue based on the detected one or more characteristics of the one or more vehicles; and the image analyzer including in the electronic reports data indicative of the determination whether there exists a potential traffic hazard, traffic issue or safety issue.

* * * * *